United States Patent
O'Dierno et al.

(10) Patent No.: US 12,055,907 B2
(45) Date of Patent: *Aug. 6, 2024

(54) BUILDING DATA PLATFORM WITH SCHEMA EXTENSIBILITY FOR PROPERTIES AND TAGS OF A DIGITAL TWIN

(71) Applicant: Tyco Fire & Security GmbH, Neuhausen am Rheinfall (CH)

(72) Inventors: Dominick James O'Dierno, Mt Pleasant, WI (US); Brian Scott Otto, Menomonee Falls, WI (US); Trent Mark Swanson, Wellington, FL (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/221,322

(22) Filed: Jul. 12, 2023

(65) Prior Publication Data

US 2023/0350362 A1 Nov. 2, 2023

Related U.S. Application Data

(63) Continuation of application No. 17/528,026, filed on Nov. 16, 2021, now Pat. No. 11,796,974.

(51) Int. Cl.
*G05B 17/02* (2006.01)
*G06F 16/21* (2019.01)

(52) U.S. Cl.
CPC ........... *G05B 17/02* (2013.01); *G06F 16/213* (2019.01)

(58) Field of Classification Search
CPC .............................. G05B 17/02; G06F 16/213
(Continued)

(56) References Cited

U.S. PATENT DOCUMENTS 5,301,109 A 4/1994 Landauer et al.
5,446,677 A 8/1995 Jensen et al.
(Continued)

FOREIGN PATENT DOCUMENTS

AU 2019226217 A1 11/2020
AU 2019226264 A1 11/2020
(Continued)

OTHER PUBLICATIONS

U.S. Appl. No. 17/354,338, filed Jun. 22, 2021, Johnson Controls Tyco IP Holdings LLP.
(Continued)

*Primary Examiner* — Mohammad Ali
*Assistant Examiner* — Joshua T Sanders
(74) *Attorney, Agent, or Firm* — Foley & Lardner LLP

(57) ABSTRACT

A building system includes one or more memory devices comprising instructions thereon that, when executed by one or more processors, cause the one or more processors to perform one or more first operations based on a digital twin of a building. The instructions cause the one or more processors to update a schema of the digital twin by adding a property or tag to an entity class of the schema, add, based on the schema, one or more data elements representing the property or tag to the digital twin, the one or more data elements related to an entity of the entity class, and perform one or more second operations based on the one or more data elements representing the property or tag.

20 Claims, 10 Drawing Sheets

(58) Field of Classification Search
USPC .................................................. 700/275
See application file for complete search history.

(56) References Cited

U.S. PATENT DOCUMENTS

| | | |
|---|---|---|
| 5,581,478 A | 12/1996 | Cruse et al. |
| 5,812,962 A | 9/1998 | Kovac |
| 5,960,381 A | 9/1999 | Singers et al. |
| 5,973,662 A | 10/1999 | Singers et al. |
| 6,014,612 A | 1/2000 | Larson et al. |
| 6,031,547 A | 2/2000 | Kennedy |
| 6,134,511 A | 10/2000 | Subbarao |
| 6,157,943 A | 12/2000 | Meyer |
| 6,285,966 B1 | 9/2001 | Brown et al. |
| 6,363,422 B1 | 3/2002 | Hunter et al. |
| 6,385,510 B1 | 5/2002 | Hoog et al. |
| 6,389,331 B1 | 5/2002 | Jensen et al. |
| 6,401,027 B1 | 6/2002 | Xu et al. |
| 6,437,691 B1 | 8/2002 | Sandelman et al. |
| 6,477,518 B1 | 11/2002 | Li et al. |
| 6,487,457 B1 | 11/2002 | Hull et al. |
| 6,493,755 B1 | 12/2002 | Hansen et al. |
| 6,577,323 B1 | 6/2003 | Jamieson et al. |
| 6,626,366 B2 | 9/2003 | Kayahara et al. |
| 6,646,660 B1 | 11/2003 | Patty |
| 6,704,016 B1 | 3/2004 | Oliver et al. |
| 6,732,540 B2 | 5/2004 | Sugihara et al. |
| 6,764,019 B1 | 7/2004 | Kayahara et al. |
| 6,782,385 B2 | 8/2004 | Natsumeda et al. |
| 6,813,532 B2 | 11/2004 | Eryurek et al. |
| 6,816,811 B2 | 11/2004 | Seem |
| 6,823,680 B2 | 11/2004 | Jayanth |
| 6,826,454 B2 | 11/2004 | Sulfstede |
| 6,865,511 B2 | 3/2005 | Frerichs et al. |
| 6,925,338 B2 | 8/2005 | Eryurek et al. |
| 6,986,138 B1 | 1/2006 | Sakaguchi et al. |
| 7,031,880 B1 | 4/2006 | Seem et al. |
| 7,401,057 B2 | 7/2008 | Eder |
| 7,552,467 B2 | 6/2009 | Lindsay |
| 7,627,544 B2 | 12/2009 | Chkodrov et al. |
| 7,818,249 B2 | 10/2010 | Lovejoy et al. |
| 7,889,051 B1 | 2/2011 | Billig et al. |
| 7,996,488 B1 | 8/2011 | Casabella et al. |
| 8,078,330 B2 | 12/2011 | Brickfield et al. |
| 8,104,044 B1 | 1/2012 | Scofield et al. |
| 8,229,470 B1 | 7/2012 | Ranjan et al. |
| 8,401,991 B2 | 3/2013 | Wu et al. |
| 8,495,745 B1 | 7/2013 | Schrecker et al. |
| 8,516,016 B2 | 8/2013 | Park et al. |
| 8,532,808 B2 | 9/2013 | Drees et al. |
| 8,532,839 B2 | 9/2013 | Drees et al. |
| 8,600,556 B2 | 12/2013 | Nesler et al. |
| 8,635,182 B2 | 1/2014 | Mackay |
| 8,682,921 B2 | 3/2014 | Park et al. |
| 8,731,724 B2 | 5/2014 | Drees et al. |
| 8,737,334 B2 | 5/2014 | Ahn et al. |
| 8,738,334 B2 | 5/2014 | Jiang et al. |
| 8,751,487 B2 | 6/2014 | Byrne et al. |
| 8,788,097 B2 | 7/2014 | Drees et al. |
| 8,805,995 B1 | 8/2014 | Oliver |
| 8,843,238 B2 | 9/2014 | Wenzel et al. |
| 8,874,071 B2 | 10/2014 | Sherman et al. |
| 8,941,465 B2 | 1/2015 | Pineau et al. |
| 8,990,127 B2 | 3/2015 | Taylor |
| 9,070,113 B2 | 6/2015 | Shafiee et al. |
| 9,116,978 B2 | 8/2015 | Park et al. |
| 9,185,095 B1 | 11/2015 | Moritz et al. |
| 9,189,527 B2 | 11/2015 | Park et al. |
| 9,196,009 B2 | 11/2015 | Drees et al. |
| 9,229,966 B2 | 1/2016 | Aymeloglu et al. |
| 9,286,582 B2 | 3/2016 | Drees et al. |
| 9,311,807 B2 | 4/2016 | Schultz et al. |
| 9,344,751 B1 | 5/2016 | Ream et al. |
| 9,354,968 B2 | 5/2016 | Wenzel et al. |
| 9,507,686 B2 | 11/2016 | Horn et al. |
| 9,524,594 B2 | 12/2016 | Ouyang et al. |
| 9,558,196 B2 | 1/2017 | Johnston et al. |
| 9,652,813 B2 | 5/2017 | Gifford et al. |
| 9,753,455 B2 | 9/2017 | Drees |
| 9,811,249 B2 | 11/2017 | Chen et al. |
| 9,838,844 B2 | 12/2017 | Emeis et al. |
| 9,886,478 B2 | 2/2018 | Mukherjee |
| 9,948,359 B2 | 4/2018 | Horton |
| 10,055,114 B2 | 8/2018 | Shah et al. |
| 10,055,206 B2 | 8/2018 | Park et al. |
| 10,116,461 B2 | 10/2018 | Fairweather et al. |
| 10,169,454 B2 | 1/2019 | Ait-Mokhtar et al. |
| 10,171,297 B2 | 1/2019 | Stewart et al. |
| 10,171,586 B2 | 1/2019 | Shaashua et al. |
| 10,187,258 B2 | 1/2019 | Nagesh et al. |
| 10,514,963 B2 | 12/2019 | Shrivastava et al. |
| 10,515,098 B2 | 12/2019 | Park et al. |
| 10,534,326 B2 | 1/2020 | Sridharan et al. |
| 10,536,295 B2 | 1/2020 | Fairweather et al. |
| 10,564,993 B2 | 2/2020 | Deutsch et al. |
| 10,705,492 B2 | 7/2020 | Harvey |
| 10,708,078 B2 | 7/2020 | Harvey |
| 10,760,815 B2 | 9/2020 | Janakiraman et al. |
| 10,762,475 B2 | 9/2020 | Song et al. |
| 10,824,120 B2 | 11/2020 | Ahmed |
| 10,845,771 B2 | 11/2020 | Harvey |
| 10,854,194 B2 | 12/2020 | Park et al. |
| 10,862,928 B1 | 12/2020 | Badawy et al. |
| 10,921,760 B2 | 2/2021 | Harvey |
| 10,921,972 B2 | 2/2021 | Park et al. |
| 10,969,133 B2 | 4/2021 | Harvey |
| 10,986,121 B2 | 4/2021 | Stockdale et al. |
| 11,016,998 B2 | 5/2021 | Park et al. |
| 11,024,292 B2 | 6/2021 | Park et al. |
| 11,038,709 B2 | 6/2021 | Park et al. |
| 11,041,650 B2 | 6/2021 | Li et al. |
| 11,054,796 B2 | 7/2021 | Holaso |
| 11,070,390 B2 | 7/2021 | Park et al. |
| 11,073,976 B2 | 7/2021 | Park et al. |
| 11,108,587 B2 | 8/2021 | Park et al. |
| 11,113,295 B2 | 9/2021 | Park et al. |
| 11,229,138 B1 | 1/2022 | Harvey et al. |
| 11,314,726 B2 | 4/2022 | Park et al. |
| 11,314,788 B2 | 4/2022 | Park et al. |
| 11,556,105 B2 | 1/2023 | Cooley et al. |
| 11,561,522 B2 | 1/2023 | Cooley et al. |
| 11,561,523 B2 | 1/2023 | Cooley et al. |
| 11,573,551 B2 | 2/2023 | Cooley et al. |
| 11,586,167 B2 | 2/2023 | Cooley et al. |
| 2002/0010562 A1 | 1/2002 | Schleiss et al. |
| 2002/0016639 A1 | 2/2002 | Smith et al. |
| 2002/0059229 A1 | 5/2002 | Natsumeda et al. |
| 2002/0123864 A1 | 9/2002 | Eryurek et al. |
| 2002/0147506 A1 | 10/2002 | Eryurek et al. |
| 2002/0177909 A1 | 11/2002 | Fu et al. |
| 2003/0005486 A1 | 1/2003 | Ridolfo et al. |
| 2003/0014130 A1 | 1/2003 | Grumelart |
| 2003/0073432 A1 | 4/2003 | Meade, II |
| 2003/0158704 A1 | 8/2003 | Triginai et al. |
| 2003/0171851 A1 | 9/2003 | Brickfield et al. |
| 2003/0200059 A1 | 10/2003 | Ignatowski et al. |
| 2004/0068390 A1 | 4/2004 | Saunders |
| 2004/0128314 A1 | 7/2004 | Katibah et al. |
| 2004/0133314 A1 | 7/2004 | Ehlers et al. |
| 2004/0199360 A1 | 10/2004 | Friman et al. |
| 2005/0055308 A1 | 3/2005 | Meyer et al. |
| 2005/0108262 A1 | 5/2005 | Fawcett et al. |
| 2005/0154494 A1 | 7/2005 | Ahmed |
| 2005/0278703 A1 | 12/2005 | Lo et al. |
| 2005/0283337 A1 | 12/2005 | Sayal |
| 2006/0095521 A1 | 5/2006 | Patinkin |
| 2006/0140207 A1 | 6/2006 | Eschbach et al. |
| 2006/0184479 A1 | 8/2006 | Levine |
| 2006/0200476 A1 | 9/2006 | Gottumukkala et al. |
| 2006/0265751 A1 | 11/2006 | Cosquer et al. |
| 2006/0271589 A1 | 11/2006 | Horowitz et al. |
| 2007/0028179 A1 | 2/2007 | Levin et al. |
| 2007/0203693 A1 | 8/2007 | Estes |
| 2007/0261062 A1 | 11/2007 | Bansal et al. |

(56) References Cited

U.S. PATENT DOCUMENTS

| | | |
|---|---|---|
| 2007/0273497 A1 | 11/2007 | Kuroda et al. |
| 2007/0273610 A1 | 11/2007 | Baillot |
| 2008/0034425 A1 | 2/2008 | Overcash et al. |
| 2008/0094230 A1 | 4/2008 | Mock et al. |
| 2008/0097816 A1 | 4/2008 | Freire et al. |
| 2008/0186160 A1 | 8/2008 | Kim et al. |
| 2008/0249756 A1 | 10/2008 | Chaisuparasmikul |
| 2008/0252723 A1 | 10/2008 | Park |
| 2008/0281472 A1 | 11/2008 | Podgorny et al. |
| 2009/0195349 A1 | 8/2009 | Frader-Thompson et al. |
| 2010/0045439 A1 | 2/2010 | Tak et al. |
| 2010/0058248 A1 | 3/2010 | Park |
| 2010/0131533 A1 | 5/2010 | Ortiz |
| 2010/0274366 A1 | 10/2010 | Fata et al. |
| 2010/0281387 A1 | 11/2010 | Holland et al. |
| 2010/0286937 A1 | 11/2010 | Hedley et al. |
| 2010/0324962 A1 | 12/2010 | Nesler et al. |
| 2011/0015802 A1 | 1/2011 | Imes |
| 2011/0047418 A1 | 2/2011 | Drees et al. |
| 2011/0061015 A1 | 3/2011 | Drees et al. |
| 2011/0071685 A1 | 3/2011 | Huneycutt et al. |
| 2011/0077950 A1 | 3/2011 | Hughston |
| 2011/0087650 A1 | 4/2011 | Mackay et al. |
| 2011/0087988 A1 | 4/2011 | Ray et al. |
| 2011/0088000 A1 | 4/2011 | Mackay |
| 2011/0125737 A1 | 5/2011 | Pothering et al. |
| 2011/0137853 A1 | 6/2011 | Mackay |
| 2011/0153603 A1 | 6/2011 | Adiba et al. |
| 2011/0154363 A1 | 6/2011 | Karmarkar |
| 2011/0157357 A1 | 6/2011 | Weisensale et al. |
| 2011/0178977 A1 | 7/2011 | Drees |
| 2011/0191343 A1 | 8/2011 | Heaton et al. |
| 2011/0205022 A1 | 8/2011 | Cavallaro et al. |
| 2011/0218777 A1 | 9/2011 | Chen et al. |
| 2012/0011126 A1 | 1/2012 | Park et al. |
| 2012/0011141 A1 | 1/2012 | Park et al. |
| 2012/0022698 A1 | 1/2012 | Mackay |
| 2012/0062577 A1 | 3/2012 | Nixon |
| 2012/0064923 A1 | 3/2012 | Imes et al. |
| 2012/0083930 A1 | 4/2012 | Ilic et al. |
| 2012/0100825 A1 | 4/2012 | Sherman et al. |
| 2012/0101637 A1 | 4/2012 | Imes et al. |
| 2012/0135759 A1 | 5/2012 | Imes et al. |
| 2012/0136485 A1 | 5/2012 | Weber et al. |
| 2012/0158633 A1 | 6/2012 | Eder |
| 2012/0259583 A1 | 10/2012 | Noboa et al. |
| 2012/0272228 A1 | 10/2012 | Marndi et al. |
| 2012/0278051 A1 | 11/2012 | Jiang et al. |
| 2013/0007063 A1 | 1/2013 | Kalra et al. |
| 2013/0038430 A1 | 2/2013 | Blower et al. |
| 2013/0038707 A1 | 2/2013 | Cunningham et al. |
| 2013/0060820 A1 | 3/2013 | Bulusu et al. |
| 2013/0086497 A1 | 4/2013 | Ambuhl et al. |
| 2013/0097706 A1 | 4/2013 | Titonis et al. |
| 2013/0103221 A1 | 4/2013 | Raman et al. |
| 2013/0167035 A1 | 6/2013 | Imes et al. |
| 2013/0170710 A1 | 7/2013 | Kuoch et al. |
| 2013/0204836 A1 | 8/2013 | Choi et al. |
| 2013/0246916 A1 | 9/2013 | Reimann et al. |
| 2013/0247205 A1 | 9/2013 | Schrecker et al. |
| 2013/0262035 A1 | 10/2013 | Mills |
| 2013/0275174 A1 | 10/2013 | Bennett et al. |
| 2013/0275908 A1 | 10/2013 | Reichard |
| 2013/0297050 A1 | 11/2013 | Reichard et al. |
| 2013/0298244 A1 | 11/2013 | Kumar et al. |
| 2013/0331995 A1 | 12/2013 | Rosen |
| 2013/0338970 A1 | 12/2013 | Reghetti |
| 2014/0032506 A1 | 1/2014 | Hoey et al. |
| 2014/0059483 A1 | 2/2014 | Mairs et al. |
| 2014/0081652 A1 | 3/2014 | Klindworth |
| 2014/0135952 A1 | 5/2014 | Maehara |
| 2014/0152651 A1 | 6/2014 | Chen et al. |
| 2014/0172184 A1 | 6/2014 | Schmidt et al. |
| 2014/0189861 A1 | 7/2014 | Gupta et al. |
| 2014/0207282 A1 | 7/2014 | Angle et al. |
| 2014/0258052 A1 | 9/2014 | Khuti et al. |
| 2014/0269614 A1 | 9/2014 | Maguire et al. |
| 2014/0277765 A1 | 9/2014 | Karimi et al. |
| 2014/0278461 A1 | 9/2014 | Artz |
| 2014/0327555 A1 | 11/2014 | Sager et al. |
| 2015/0019174 A1 | 1/2015 | Kiff et al. |
| 2015/0042240 A1 | 2/2015 | Aggarwal et al. |
| 2015/0105917 A1 | 4/2015 | Sasaki et al. |
| 2015/0145468 A1 | 5/2015 | Ma et al. |
| 2015/0156031 A1 | 6/2015 | Fadell et al. |
| 2015/0168931 A1 | 6/2015 | Jin |
| 2015/0172300 A1 | 6/2015 | Cochenour |
| 2015/0178421 A1 | 6/2015 | Borrelli et al. |
| 2015/0185261 A1 | 7/2015 | Frader-Thompson et al. |
| 2015/0186777 A1 | 7/2015 | Lecue et al. |
| 2015/0202962 A1 | 7/2015 | Habashima et al. |
| 2015/0204563 A1 | 7/2015 | Imes et al. |
| 2015/0235267 A1 | 8/2015 | Steube et al. |
| 2015/0241895 A1 | 8/2015 | Lu et al. |
| 2015/0244730 A1 | 8/2015 | Vu et al. |
| 2015/0244732 A1 | 8/2015 | Golshan et al. |
| 2015/0261863 A1 | 9/2015 | Dey et al. |
| 2015/0263900 A1 | 9/2015 | Polyakov et al. |
| 2015/0286969 A1 | 10/2015 | Warner et al. |
| 2015/0295796 A1 | 10/2015 | Hsiao et al. |
| 2015/0304193 A1 | 10/2015 | Ishii et al. |
| 2015/0316918 A1 | 11/2015 | Schleiss et al. |
| 2015/0324422 A1 | 11/2015 | Elder |
| 2015/0341212 A1 | 11/2015 | Hsiao et al. |
| 2015/0348417 A1 | 12/2015 | Ignaczak et al. |
| 2015/0379080 A1 | 12/2015 | Jochimski |
| 2016/0011753 A1 | 1/2016 | Mcfarland et al. |
| 2016/0033946 A1 | 2/2016 | Zhu et al. |
| 2016/0035246 A1 | 2/2016 | Curtis |
| 2016/0065601 A1 | 3/2016 | Gong et al. |
| 2016/0070736 A1 | 3/2016 | Swan et al. |
| 2016/0078229 A1 | 3/2016 | Gong et al. |
| 2016/0090839 A1 | 3/2016 | Stolarczyk |
| 2016/0119434 A1 | 4/2016 | Dong et al. |
| 2016/0127712 A1 | 5/2016 | Alfredsson et al. |
| 2016/0139752 A1 | 5/2016 | Shim et al. |
| 2016/0163186 A1 | 6/2016 | Davidson et al. |
| 2016/0170390 A1 | 6/2016 | Xie et al. |
| 2016/0171862 A1 | 6/2016 | Das et al. |
| 2016/0173816 A1 | 6/2016 | Huenerfauth et al. |
| 2016/0179315 A1 | 6/2016 | Sarao et al. |
| 2016/0179342 A1 | 6/2016 | Sarao et al. |
| 2016/0179990 A1 | 6/2016 | Sarao et al. |
| 2016/0195856 A1 | 7/2016 | Spero |
| 2016/0212165 A1 | 7/2016 | Singla et al. |
| 2016/0239660 A1 | 8/2016 | Azvine et al. |
| 2016/0239756 A1 | 8/2016 | Aggour et al. |
| 2016/0247129 A1 | 8/2016 | Song et al. |
| 2016/0260063 A1 | 9/2016 | Harris et al. |
| 2016/0313751 A1 | 10/2016 | Risbeck et al. |
| 2016/0313752 A1 | 10/2016 | Przybylski |
| 2016/0313902 A1 | 10/2016 | Hill et al. |
| 2016/0350364 A1 | 12/2016 | Anicic et al. |
| 2016/0357521 A1 | 12/2016 | Zhang et al. |
| 2016/0357828 A1 | 12/2016 | Tobin et al. |
| 2016/0358432 A1 | 12/2016 | Branscomb et al. |
| 2016/0363336 A1 | 12/2016 | Roth et al. |
| 2016/0370258 A1 | 12/2016 | Perez |
| 2016/0378306 A1 | 12/2016 | Kresl et al. |
| 2016/0379326 A1 | 12/2016 | Chan-Gove et al. |
| 2017/0006135 A1 | 1/2017 | Siebel |
| 2017/0011318 A1 | 1/2017 | Vigano et al. |
| 2017/0017221 A1 | 1/2017 | Lamparter et al. |
| 2017/0039255 A1 | 2/2017 | Raj et al. |
| 2017/0052536 A1 | 2/2017 | Warner et al. |
| 2017/0053441 A1 | 2/2017 | Nadumane et al. |
| 2017/0063894 A1 | 3/2017 | Muddu et al. |
| 2017/0068409 A1 | 3/2017 | Nair |
| 2017/0070775 A1 | 3/2017 | Taxier et al. |
| 2017/0075984 A1 | 3/2017 | Deshpande et al. |
| 2017/0084168 A1 | 3/2017 | Janchookiat |
| 2017/0090437 A1 | 3/2017 | Veeramani et al. |
| 2017/0093700 A1 | 3/2017 | Gilley et al. |
| 2017/0098086 A1 | 4/2017 | Hoernecke et al. |

(56) References Cited

U.S. PATENT DOCUMENTS

| | | |
|---|---|---|
| 2017/0103327 A1 | 4/2017 | Penilla et al. |
| 2017/0103403 A1 | 4/2017 | Chu et al. |
| 2017/0123389 A1 | 5/2017 | Baez et al. |
| 2017/0134415 A1 | 5/2017 | Muddu et al. |
| 2017/0177715 A1 | 6/2017 | Chang et al. |
| 2017/0180147 A1 | 6/2017 | Brandman et al. |
| 2017/0188216 A1 | 6/2017 | Koskas et al. |
| 2017/0212482 A1 | 7/2017 | Boettcher et al. |
| 2017/0212668 A1 | 7/2017 | Shah et al. |
| 2017/0220641 A1 | 8/2017 | Chi et al. |
| 2017/0230930 A1 | 8/2017 | Frey |
| 2017/0235817 A1 | 8/2017 | Deodhar et al. |
| 2017/0251182 A1 | 8/2017 | Siminoff et al. |
| 2017/0270124 A1 | 9/2017 | Nagano et al. |
| 2017/0277769 A1 | 9/2017 | Pasupathy et al. |
| 2017/0278003 A1 | 9/2017 | Liu |
| 2017/0294132 A1 | 10/2017 | Colmenares |
| 2017/0315522 A1 | 11/2017 | Kwon et al. |
| 2017/0315697 A1 | 11/2017 | Jacobson et al. |
| 2017/0322534 A1 | 11/2017 | Sinha et al. |
| 2017/0323389 A1 | 11/2017 | Vavrasek |
| 2017/0329289 A1 | 11/2017 | Kohn et al. |
| 2017/0336770 A1 | 11/2017 | Macmillan |
| 2017/0345287 A1 | 11/2017 | Fuller et al. |
| 2017/0351957 A1 | 12/2017 | Lecue et al. |
| 2017/0357225 A1 | 12/2017 | Asp et al. |
| 2017/0357490 A1 | 12/2017 | Park et al. |
| 2017/0357908 A1 | 12/2017 | Cabadi et al. |
| 2018/0012159 A1 | 1/2018 | Kozloski et al. |
| 2018/0013579 A1 | 1/2018 | Fairweather et al. |
| 2018/0024520 A1 | 1/2018 | Sinha et al. |
| 2018/0032627 A1* | 2/2018 | Margatan ............... H04L 67/535 |
| 2018/0039238 A1 | 2/2018 | Gärtner et al. |
| 2018/0048485 A1 | 2/2018 | Pelton et al. |
| 2018/0069932 A1 | 3/2018 | Tiwari et al. |
| 2018/0114140 A1 | 4/2018 | Chen et al. |
| 2018/0137288 A1 | 5/2018 | Polyakov |
| 2018/0157930 A1 | 6/2018 | Rutschman et al. |
| 2018/0162400 A1 | 6/2018 | Abdar |
| 2018/0174057 A1 | 6/2018 | Citriniti et al. |
| 2018/0176241 A1 | 6/2018 | Manadhata et al. |
| 2018/0198627 A1 | 7/2018 | Mullins |
| 2018/0203961 A1 | 7/2018 | Aisu et al. |
| 2018/0239982 A1 | 8/2018 | Rutschman et al. |
| 2018/0275625 A1 | 9/2018 | Park et al. |
| 2018/0276962 A1 | 9/2018 | Butler et al. |
| 2018/0292797 A1 | 10/2018 | Lamparter et al. |
| 2018/0336785 A1 | 11/2018 | Ghannam et al. |
| 2018/0356775 A1 | 12/2018 | Harvey |
| 2018/0359111 A1 | 12/2018 | Harvey |
| 2018/0364654 A1 | 12/2018 | Locke et al. |
| 2019/0005025 A1 | 1/2019 | Malabarba |
| 2019/0013023 A1 | 1/2019 | Pourmohammad et al. |
| 2019/0025771 A1 | 1/2019 | Park et al. |
| 2019/0037135 A1 | 1/2019 | Hedge |
| 2019/0042988 A1 | 2/2019 | Brown et al. |
| 2019/0088106 A1 | 3/2019 | Grundstrom |
| 2019/0094824 A1 | 3/2019 | Xie et al. |
| 2019/0096217 A1 | 3/2019 | Pourmohammad et al. |
| 2019/0102840 A1 | 4/2019 | Perl et al. |
| 2019/0121801 A1 | 4/2019 | Jethwa et al. |
| 2019/0138512 A1 | 5/2019 | Pourmohammad et al. |
| 2019/0147883 A1 | 5/2019 | Mellenthin et al. |
| 2019/0158309 A1 | 5/2019 | Park et al. |
| 2019/0163152 A1 | 5/2019 | Worrall et al. |
| 2019/0268178 A1 | 8/2019 | Fairweather et al. |
| 2019/0310979 A1 | 10/2019 | Masuzaki et al. |
| 2019/0377306 A1 | 12/2019 | Harvey |
| 2020/0028791 A1 | 1/2020 | Mcgrath et al. |
| 2020/0134106 A1 | 4/2020 | Suomi et al. |
| 2020/0226156 A1 | 7/2020 | Borra et al. |
| 2020/0233391 A1* | 7/2020 | Ma ..................... G05B 19/042 |
| 2020/0285203 A1 | 9/2020 | Thakur et al. |
| 2020/0304375 A1 | 9/2020 | Chennai et al. |
| 2020/0336328 A1 | 10/2020 | Harvey |
| 2020/0348632 A1 | 11/2020 | Harvey |
| 2020/0387576 A1 | 12/2020 | Brett et al. |
| 2020/0396208 A1 | 12/2020 | Brett et al. |
| 2021/0042299 A1 | 2/2021 | Migliori |
| 2021/0043221 A1 | 2/2021 | Yelchuru et al. |
| 2021/0096975 A1 | 4/2021 | Deluca et al. |
| 2021/0133670 A1 | 5/2021 | Cella et al. |
| 2021/0158307 A1 | 5/2021 | Deluca et al. |
| 2021/0200164 A1 | 7/2021 | Ploegert et al. |
| 2021/0200165 A1 | 7/2021 | Ploegert et al. |
| 2021/0200169 A1 | 7/2021 | Ploegert et al. |
| 2021/0200170 A1 | 7/2021 | Ploegert et al. |
| 2021/0200171 A1 | 7/2021 | Sridharan et al. |
| 2021/0200173 A1 | 7/2021 | Ploegert et al. |
| 2021/0200174 A1 | 7/2021 | Sridharan et al. |
| 2021/0200713 A1 | 7/2021 | Sridharan et al. |
| 2021/0200764 A1 | 7/2021 | Ploegert et al. |
| 2021/0200792 A1 | 7/2021 | Ploegert et al. |
| 2021/0200807 A1 | 7/2021 | Ploegert et al. |
| 2021/0200912 A1 | 7/2021 | Ploegert et al. |
| 2021/0216052 A1 | 7/2021 | Ploegert et al. |
| 2021/0325070 A1 | 10/2021 | Endel et al. |
| 2021/0342961 A1 | 11/2021 | Winter et al. |
| 2021/0381711 A1 | 12/2021 | Harvey et al. |
| 2021/0381712 A1 | 12/2021 | Harvey et al. |
| 2021/0382445 A1 | 12/2021 | Harvey et al. |
| 2021/0383041 A1 | 12/2021 | Harvey et al. |
| 2021/0383042 A1 | 12/2021 | Harvey et al. |
| 2021/0383200 A1 | 12/2021 | Harvey et al. |
| 2021/0383219 A1 | 12/2021 | Harvey et al. |
| 2021/0383235 A1 | 12/2021 | Harvey et al. |
| 2021/0383236 A1 | 12/2021 | Harvey et al. |
| 2022/0066402 A1 | 3/2022 | Harvey et al. |
| 2022/0066405 A1 | 3/2022 | Harvey |
| 2022/0066432 A1 | 3/2022 | Harvey et al. |
| 2022/0066434 A1 | 3/2022 | Harvey et al. |
| 2022/0066528 A1 | 3/2022 | Harvey et al. |
| 2022/0066722 A1 | 3/2022 | Harvey et al. |
| 2022/0066754 A1 | 3/2022 | Harvey et al. |
| 2022/0066761 A1 | 3/2022 | Harvey et al. |
| 2022/0067226 A1 | 3/2022 | Harvey et al. |
| 2022/0067227 A1 | 3/2022 | Harvey et al. |
| 2022/0067230 A1 | 3/2022 | Harvey et al. |
| 2022/0069863 A1 | 3/2022 | Harvey et al. |
| 2022/0070293 A1 | 3/2022 | Harvey et al. |
| 2022/0121965 A1 | 4/2022 | Chatterji et al. |
| 2022/0138684 A1 | 5/2022 | Harvey |
| 2022/0147000 A1 | 5/2022 | Cooley et al. |
| 2022/0150124 A1 | 5/2022 | Cooley et al. |
| 2022/0215264 A1 | 7/2022 | Harvey et al. |
| 2023/0010757 A1 | 1/2023 | Preciado |
| 2023/0071312 A1 | 3/2023 | Preciado et al. |
| 2023/0076011 A1 | 3/2023 | Preciado et al. |
| 2023/0083703 A1 | 3/2023 | Meiners |
| 2023/0214555 A1 | 7/2023 | Harvey et al. |

FOREIGN PATENT DOCUMENTS

| | | | | |
|---|---|---|---|---|
| CA | 2936571 A1 * | 7/2015 | ......... | G06F 21/6218 |
| CA | 2936571 C | 11/2019 | | |
| CN | 101415011 A | 4/2009 | | |
| CN | 102136099 A | 7/2011 | | |
| CN | 102136100 A | 7/2011 | | |
| CN | 102650876 A | 8/2012 | | |
| CN | 104040583 A | 9/2014 | | |
| CN | 104603832 A | 5/2015 | | |
| CN | 104919484 A | 9/2015 | | |
| CN | 106204392 A | 12/2016 | | |
| CN | 106406806 A | 2/2017 | | |
| CN | 106960269 A | 7/2017 | | |
| CN | 107147639 A1 | 9/2017 | | |
| CN | 107598928 A | 1/2018 | | |
| EP | 2 528 033 A1 | 11/2012 | | |
| EP | 3 268 821 B1 | 1/2018 | | |
| EP | 3 324 306 A1 | 5/2018 | | |
| EP | 4 226 263 A1 | 8/2023 | | |
| JP | H10-049552 A | 2/1998 | | |
| JP | 2003-162573 A | 6/2003 | | |
| JP | 2007-018322 A | 1/2007 | | |

(56) References Cited

FOREIGN PATENT DOCUMENTS

| | | |
|---|---|---|
| JP | 4073946 B1 | 4/2008 |
| JP | 2008-107930 A | 5/2008 |
| JP | 2013-152618 A | 8/2013 |
| JP | 2014-044457 A | 3/2014 |
| KR | 2016/0102923 A | 8/2016 |
| WO | WO-2009/020158 A1 | 2/2009 |
| WO | WO-2011/100255 A2 | 8/2011 |
| WO | WO-2013/050333 A1 | 4/2013 |
| WO | WO-2015/106702 A1 | 7/2015 |
| WO | WO-2015/145648 A1 | 10/2015 |
| WO | WO-2017/035536 A1 | 3/2017 |
| WO | WO-2017/192422 A1 | 11/2017 |
| WO | WO-2017/194244 A1 | 11/2017 |
| WO | WO-2017/205330 A1 | 11/2017 |
| WO | WO-2017/213918 A1 | 12/2017 |
| WO | WO-2018/132112 A1 | 7/2018 |
| WO | WO-2019/067631 A1 | 4/2019 |
| WO | WO-2019067631 A1 * | 4/2019 ............ G05B 15/02 |
| WO | WO-2020/061621 A1 | 4/2020 |
| WO | WO-2022/042925 A1 | 3/2022 |
| WO | WO-2022/103812 A1 | 5/2022 |
| WO | WO-2022/103813 A1 | 5/2022 |
| WO | WO-2022/103820 A1 | 5/2022 |
| WO | WO-2022/103822 A1 | 5/2022 |
| WO | WO-2022/103824 A1 | 5/2022 |
| WO | WO-2022/103829 A1 | 5/2022 |
| WO | WO-2022/103831 A1 | 5/2022 |

OTHER PUBLICATIONS

U.S. Appl. No. 17/354,436, filed Jun. 22, 2021, Johnson Controls Tyco IP Holdings LLP.
U.S. Appl. No. 17/567,275, filed Feb. 9, 2022, Harvey et al.
U.S. Appl. No. 17/722,115, Passivelogic, Inc.
Balaji et al., "Brick: Metadata schema for portable smart building applications," Applied Energy, 2018 (20 pages).
Balaji et al., "Brick: Metadata schema for portable smart building applications," Applied Energy, Sep. 15, 2018, 3 pages, (Abstract).
Balaji et al., "Demo Abstract: Portable Queries Using the Brick Schema for Building Applications," BuildSys '16, Palo Alto, CA, USA, Nov. 16-17, 2016 (2 pages).
Balaji, B. et al., "Brick: Towards a Unified Metadata Schema For Buildings." BuildSys '16, Palo Alto, CA, USA, Nov. 16-17, 2016 (10 pages).
Bhattacharya et al., "Short Paper: Analyzing Metadata Schemas for Buildings—The Good, The Bad and The Ugly," BuildSys '15, Seoul, South Korea, Nov. 4-5, 2015 (4 pages).
Bhattacharya, A., "Enabling Scalable Smart-Building Analytics," Electrical Engineering and Computer Sciences, University of California at Berkeley, Technical Report No. UCB/EECS-2016-201, Dec. 15, 2016 (121 pages).
Brick, "Brick Schema: Building Blocks for Smart Buildings," URL: chrome-extension://efaidnbmnnnibpcajpcglclefindmkaj/https://www.memoori.com/wp-content/uploads/2016/06/Brick_Schema_Whitepaper.pdf, Mar. 2019 (17 pages).
Brick, "Brick: Towards a Unified Metadata Schema For Buildings," URL: chrome-extension://efaidnbmnnnibpcajpcglclefindmkaj/https://brickschema.org/papers/Brick_BuildSys_Presen tation.pdf, Presented at BuildSys '16, Nov. 2016 (46 pages).
Brick, "Metadata Schema for Buildings," URL: https://brickschema.org/docs/Brick-Leaflet.pdf, retrieved from internet Dec. 24, 2019 (3 pages).
Chinese Office Action on CN Appl. Ser. No. 201780003995.9 dated Apr. 8, 2021 (21 pages with English language translation).
Chinese Office action on CN Appl. Ser. No. 201780043400.2 dated Apr. 25, 2021 (15 pages with English language translation).
Curry, E. et al., "Linking building data in the cloud: Integrating cross-domain building data using linked data." Advanced Engineering Informatics, 2013, 27 (pp. 206-219).

Digital Platform Litigation Documents Part 1, includes cover letter, dismissal of case DDE-1-21-cv-01796, IPR2023-00022 (documents filed Jan. 26, 2023-Oct. 7, 2022), and IPR2023-00085 (documents filed Jan. 26, 2023-Oct. 20, 2022) (748 pages total).
Digital Platform Litigation Documents Part 10, includes DDE-1-21-cv-01796 (documents filed Nov. 1, 2022-Dec. 22, 2021 (1795 pages total).
Digital Platform Litigation Documents Part 2, includes IPR2023-00085 (documents filed Oct. 20, 2022) (172 pages total).
Digital Platform Litigation Documents Part 3, includes IPR2023-00085 (documents filed Oct. 20, 2022) and IPR2023-00170 (documents filed Nov. 28, 2022-Nov. 7, 2022) (397 pages total).
Digital Platform Litigation Documents Part 4, includes IPR2023-00170 (documents filed Nov. 7, 2022) and IPR2023-00217 (documents filed Jan. 18, 2023-Nov. 15, 2022) (434 pages total).
Digital Platform Litigation Documents Part 5, includes IPR2023-00217 (documents filed Nov. 15, 2022) and IPR2023-00257 (documents filed Jan. 25, 2023-Nov. 23, 2022) (316 pages total).
Digital Platform Litigation Documents Part 6, includes IPR2023-00257 (documents filed Nov. 23, 2022) and IPR 2023-00346 (documents filed Jan. 3, 2023-Dec. 13, 2022) (295 pages total).
Digital Platform Litigation Documents Part 7, includes IPR 2023-00346 (documents filed Dec. 13, 2022) and IPR2023-00347 (documents filed Jan. 3, 2023-Dec. 13, 2022) (217 pages total).
Digital Platform Litigation Documents Part 8, includes IPR2023-00347 (documents filed Dec. 13, 2022), EDTX-2-22-cv-00243 (documents filed Sep. 20, 2022-Jun. 29, 22), and DDE-1-21-cv-01796 (documents filed Feb. 3, 2023-Jan. 10, 2023 (480 pages total).
Digital Platform Litigation Documents Part 9, includes DDE-1-21-cv-01796 (documents filed Jan. 10, 2023-Nov. 1, 2022 (203 pages total).
El Kaed, C. et al., "Building management insights driven by a multi-system semantic representation approach," 2016 IEEE 3rd World Forum on Internet of Things (WF-IoT), Dec. 12-14, 2016, (pp. 520-525).
Ellis, C. et al., "Creating a room connectivity graph of a building from per-room sensor units." BuildSys '12, Toronto, ON, Canada, Nov. 6, 2012 (7 pages).
Extended European Search Report on EP Application No. 18196948.6 dated Apr. 10, 2019 (9 pages).
Fierro et al., "Beyond a House of Sticks: Formalizing Metadata Tags with Brick," BuildSys '19, New York, NY, USA, Nov. 13-14, 2019 (10 pages).
Fierro et al., "Dataset: An Open Dataset and Collection Tool for BMS Point Labels," DATA'19, New York, NY, USA, Nov. 10, 2019 (3 pages).
Fierro et al., "Design and Analysis of a Query Processor for Brick," ACM Transactions on Sensor Networks, Jan. 2018, vol. 1, No. 1, art. 1 (25 pages).
Fierro et al., "Design and Analysis of a Query Processor for Brick," BuildSys '17, Delft, Netherlands, Nov. 8-9, 2017 (10 pages).
Fierro et al., "Mortar: An Open Testbed for Portable Building Analytics," BuildSys '18, Shenzhen, China, Nov. 7-8, 2018 (10 pages).
Fierro et al., "Why Brick is a Game Changer for Smart Buildings," URL: https://brickschema.org/papers/Brick_Memoori_Webinar_Presentation.pdf, Memoori Webinar, 2019 (67 pages).
Fierro, "Writing Portable Building Analytics with the Brick Metadata Schema," UC Berkeley, ACM E-Energy, 2019 (39 pages).
Fierro, G., "Design of an Effective Ontology and Query Processor Enabling Portable Building Applications," Electrical Engineering and Computer Sciences, University of California at Berkeley, Technical Report No. UCB/EECS-2019-106, Jue 27, 2019 (118 pages).
File History for U.S. Appl. 12/776,159, filed May 7, 2010 (722 pages).
Final Conference Program, ACM BuildSys 2016, Stanford, CA, USA, Nov. 15-17, 2016 (7 pages).
Gao et al., "A large-scale evaluation of automated metadata inference approaches on sensors from air handling units," Advanced Engineering Informatics, 2018, 37 (pp. 14-30).

(56) References Cited

OTHER PUBLICATIONS

Harvey, T., "Quantum Part 3: The Tools of Autonomy, How PassiveLogic's Quantum Creator and Autonomy Studio software works," URL: https://www.automatedbuildings.com/news/jan22/articles/passive/211224010000passive.html, Jan. 2022 (7 pages).

Harvey, T., "Quantum: The Digital Twin Standard for Buildings," URL: https://www.automatedbuildings.com/news/feb21/articles/passivelogic/210127124501passivelogic.html, Feb. 2021 (6 pages).

Hazelcast, "What is Distributed Computing," URL: https://hazelcast.com/glossary/distributed-computing/ retrieved from https:/web.archive.org/web/20201014084706/https://hazelcast.com/glossary/distributed-computing/, retrieved from internet May 3, 2022 (6 pages).

Hu, S. et al., "Building performance optimisation: A hybrid architecture for the integration of contextual information and time-series data," Automation in Construction, 2016, 70 (pp. 51-61).

International Search Report and Written Opinion for PCT Appl. Ser. No. PCT/US2017/013831 dated Mar. 31, 2017 (14 pages).

International Search Report and Written Opinion for PCT Appl. Ser. No. PCT/US2017/035524 dated Jul. 24, 2017 (14 pages).

International Search Report and Written Opinion on PCT/US2017/052060, mailed Oct. 5, 2017, 11 pages.

International Search Report and Written Opinion on PCT/US2017/052633, mailed Oct. 23, 2017, 9 pages.

International Search Report and Written Opinion on PCT/US2017/052829, mailed Nov. 27, 2017, 24 pages.

International Search Report and Written Opinion on PCT/US2018/024068, mailed Jun. 15, 2018, 22 pages.

International Search Report and Written Opinion on PCT/US2018/052971, dated Mar. 1, 2019, 19 pages.

International Search Report and Written Opinion on PCT/US2018/052974, mailed Dec. 19, 2018, 13 pages.

International Search Report and Written Opinion on PCT/US2018/052975, mailed Jan. 2, 2019, 13 pages.

International Search Report and Written Opinion on PCT/US2018/052994, mailed Jan. 7, 2019, 15 pages.

International Search Report and Written Opinion on PCT/US2019/015481, dated May 17, 2019, 15 pages.

International Search Report and Written Opinion on PCT/US2020/058381, dated Jan. 27, 2021, 30 pages.

Japanese Office Action on JP Appl. Ser. No. 2018-534963 dated May 11, 2021 (16 pages with English language translation).

Koh et al., "Plaster: An Integration, Benchmark, and Development Framework for Metadata Normalization Methods," BuildSys '18, Shenzhen, China, Nov. 7-8, 2018 (10 pages).

Koh et al., "Scrabble: Transferrable Semi-Automated Semantic Metadata Normalization using Intermediate Representation," BuildSys '18, Shenzhen, China, Nov. 7-8, 2018 (10 pages).

Koh et al., "Who can Access What, and When?" BuildSys '19, New York, NY, USA, Nov. 13-14, 2019 (4 pages).

Li et al., "Event Stream Processing with Out-of-Order Data Arrival," International Conferences on Distributed Computing Systems, 2007, (8 pages).

Nissin Electric Co., Ltd., "Smart power supply system (SPSS)," Outline of the scale verification plan, Nissin Electric Technical Report, Japan, Apr. 23, 2014, vol. 59, No. 1 (23 pages with English language abstract).

Passivelogic, "Explorer: Digital Twin Standard for Autonomous Systems. Made interactive." URL: https://passivelogic.com/software/quantum-explorer/, retrieved from internet Jan. 4, 2023 (13 pages).

Passivelogic, "Quantum: The Digital Twin Standard for Autonomous Systems, A physics-based ontology for next-generation control and AI." URL: https://passivelogic.com/software/quantum-standard/, retrieved from internet Jan. 4, 2023 (20 pages).

Quantum Alliance, "Quantum Explorer Walkthrough," 2022, (7 pages) (screenshots from video).

Results of the Partial International Search for PCT/US2018/052971, dated Jan. 3, 2019, 3 pages.

Sinha, Sudhi and Al Huraimel, Khaled, "Reimagining Businesses with AI" John Wiley & Sons, Inc., Hoboken, NJ, USA, first ed. published 2020 (156 pages).

Sinha, Sudhi R. and Park, Youngchoon, "Building an Effective IoT Ecosystem for Your Business," Johnson Controls International, Springer International Publishing, 2017 (286 pages).

Sinha, Sudhi, "Making Big Data Work for Your Business: A guide to effective Big Data analytics," Impackt Publishing LTD., Birmingham, UK, Oct. 2014 (170 pages).

The Virtual Nuclear Tourist, "Calvert Cliffs Nuclear Power Plant," URL: http://www.nucleartourist.com/us/calvert.htm, Jan. 11, 2006 (2 pages).

University of California At Berkeley, Eecs Department, "Enabling Scalable Smart- Building Analytics," URL: https://www2.eecs.berkeley.edu/Pubs/TechRpts/2016/EECS-2016-201.html, retrieved from internet Feb. 15, 2023 (7 pages).

Van Hoof, Bert, "Announcing Azure Digital Twins: Create digital replicas of spaces and infrastructure using cloud, AI and IoT," URL: https://azure.microsoft.com/en-US/blog/announcing-azure-digital-twins-create-digital-replicas-of-spaces-and-infrastructure-using-cloud-ai-and-iot/, Sep. 24, 2018 (11 pages).

W3C, "SPARQL: Query Language for RDF," located on The Wayback Machine, URL: https://web.archive.org/web/20161230061728/http://www.w3.org/TR/rdf-sparql-query/), retrieved from internet Nov. 15, 2022 (89 pages).

Wei et al., "Development and Implementation of Software Gateways of Fire Fighting Subsystem Running on EBI," Control, Automation and Systems Engineering, IITA International Conference on, IEEE, Jul. 2009 (pp. 9-12).

White et al., "Reduce building maintenance costs with AWS IoT TwinMaker Knowledge Graph," The Internet of Things on AWS—Official Blog, URL: https://aws.amazon.com/blogs/iot/reduce-building-maintenance-costs-with-aws-iot-twinmaker-knowledge-graph/, Nov. 18, 2022 (10 pages).

Zhou, Q. et al., "Knowledge-infused and Consistent Complex Event Processing over Real-time and Persistent Streams," Further Generation Computer Systems, 2017, 76 (pp. 391-406).

\* cited by examiner

BUILDING DATA PLATFORM WITH SCHEMA EXTENSIBILITY FOR PROPERTIES AND TAGS OF A DIGITAL TWIN

CROSS-REFERENCE TO RELATED APPLICATIONS

This application is a continuation of U.S. patent application Ser. No. 17/528,026 filed Nov. 16, 2021, which is incorporated herein by reference in its entirety.

BACKGROUND

The present application relates generally to a building system with a digital twin. More specifically, the present application relates to the schema of the digital twin.

The building system can operate against a digital twin, for example, the digital twin may inform the building system of information pertaining to the building that the building system operates against. However, the schema that the digital twin is deployed in may be static, i.e., does not change. This may cause problems if the schema does not allow for a particular expression of information that would be useful for systems of the building to operate against. A significant amount of time may be wasted redeveloping schemas and redeploying systems in order to express information in the digital twin that is needed by other systems.

SUMMARY

Dynamic Property or Tag

A building system including one or more memory devices including instructions thereon that, when executed by one or more processors, cause the one or more processors to perform one or more first operations based on a digital twin of a building, the digital twin including representations of entities of the building and relationships between the entities. The instructions cause the one or more processors to update a schema of the digital twin by adding a property or tag to an entity class of the schema, add, based on the schema, one or more data elements representing the property or tag to the digital twin, the one or more data elements related to an entity of the entity class, the plurality of entities including the entity, and perform one or more second operations based on the one or more data elements representing the property or tag.

In some embodiments, the entities include at least one of a person, point, location, or event, wherein the schema defines entity classes for entity types of the entities.

In some embodiments, the entities are instances of entity classes defined by the schema.

In some embodiments, the property or the tag defines a characteristic of the entity.

In some embodiments, the instructions cause the one or more processors to update the schema of the digital twin while the digital twin is deployed without requiring the digital twin to be redeployed.

In some embodiments, the schema defines entity classes, the entity classes indicating properties, tags, and states for the entity classes.

In some embodiments, the instructions cause the one or more processors to identify entity nodes indicating entities in the entity class and add, based on the schema, the one or more nodes representing the property or tag to the digital twin for each of the entity nodes, the one or more nodes related to the entity nodes.

In some embodiments, the digital twin include nodes and edges between the nodes, the plurality of nodes representing the entities of the building and the edges indicating the relationships between the entities. In some embodiments, instructions cause the one or more processors to add, based on the schema, one or more nodes representing the property or tag to the digital twin, the one or more nodes related to a node representing the entity of the entity class by one or more edges.

In some embodiments, the instructions cause the one or more processors to receive an indication to add the property or tag to a first entity, identify the entity class of the first entity based on the schema, update the schema of the digital twin by adding the property or tag to the entity class of the schema responsive to identifying that a class of the first entity is the entity class, and add, based on the schema, the one or more nodes representing the property or tag to the digital twin, the one or more nodes related to the node representing the entity of the entity class, wherein the entity is a second entity different from the first entity.

In some embodiments, the instructions cause the one or more processors to receive user input from a user device, the user input defining the property or the tag to be added to the entity class of the schema and update, based on the user input, the schema of the digital twin by adding the property or tag to the entity class of the schema in responsive to receiving the user input.

In some embodiments, the instructions cause the one or more processors to identify an update to one or more particular nodes or one or more particular edges of the digital twin, the update indicating changes affecting the entity, determine that the update indicates a change to one or more characteristics of the entity, and update the schema of the digital twin by adding the property or tag to the entity class of the schema responsive to determining that the update indicates the change to the one or more characteristics of the entity.

Another implementation of the present disclosure is a method including performing, by one or more processing circuits, one or more first operations based on a digital twin of a building, the digital twin including representations of entities of the building and relationships between the entities. The method includes updating, by the one or more processing circuits, a schema of the digital twin by adding a property or tag to an entity class of the schema, adding, by the one or more processing circuits, based on the schema, one or more data elements representing the property or tag to the digital twin, the one or more data elements related to an entity of the entity class, the entities including the entity, and performing, by the one or more processing circuits, one or more second operations based on the one or more data elements representing the property or tag.

In some embodiments, the entities include at least one of a person, point, location, or event, wherein the schema defines entity classes for entity types of the entities.

In some embodiments, the property or the tag defines a characteristic of the entity.

In some embodiments, updating, by the one or more processing circuits, the schema of the digital twin while the digital twin is deployed without requiring the digital twin to be redeployed.

In some embodiments, the schema defines entity classes, the entity classes indicating properties, tags, and states for the entity classes.

In some embodiments, the digital twin includes a plurality of nodes and a plurality of edges between the plurality of nodes, the plurality of nodes representing the plurality of entities of the building and the plurality of edges indicating the relationships between the plurality of entities. In some embodiments, the method further includes adding, by the one or more processing circuits, based on the schema, one or more nodes representing the property or tag to the digital twin, the one or more nodes related to a node representing the entity of the entity class by one or more edges.

In some embodiments, the method includes identifying, by the one or more processing circuits, entity nodes indicating entities in the entity class and adding, by the one or more processing circuits, based on the schema, the one or more nodes representing the property or tag to the digital twin for each of the entity nodes, the one or more nodes related to the entity nodes.

In some embodiments, the method includes receiving, by the one or more processing circuits, an indication to add the property or tag to a first entity, identifying, by the one or more processing circuits, the entity class of the first entity based on the schema, updating, by the one or more processing circuits, the schema of the digital twin by adding the property or tag to the entity class of the schema responsive to identifying that a class of the first entity is the entity class, and adding, by the one or more processing circuits, based on the schema, the one or more nodes representing the property or tag to the digital twin, the one or more nodes related to the node representing the entity of the entity class, wherein the entity is a second entity different from the first entity.

In some embodiments, the method includes receiving, by the one or more processing circuits, user input from a user device, the user input defining the property or the tag to be added to the entity class of the schema and updating, by the one or more processing circuits, based on the user input, the schema of the digital twin by adding the property or tag to the entity class of the schema in responsive to receiving the user input.

In some embodiments, the method includes identifying, by the one or more processing circuits, an update to one or more particular nodes or one or more particular edges of the digital twin, the update indicating changes affecting the entity, determining, by the one or more processing circuits, that the update indicates a change to one or more characteristics of the entity and updating, by the one or more processing circuits, the schema of the digital twin by adding the property or tag to the entity class of the schema responsive to determining that the update indicates the change to the one or more characteristics of the entity.

Another implementation of the present disclosure is a building system including one or more memory devices including instructions thereon and one or more processors configured to execute the instructions causing the one or more processors to perform one or more first operations based on a digital twin of a building, the digital twin including representations of entities of the building and the edges indicating relationships between the entities. The instructions cause the one or more processors to update a schema of the digital twin by adding a property or tag to an entity class of the schema, add, based on the schema, one or more data elements representing the property or tag to the digital twin, the one or more data elements related to an entity of the entity class, the entities including the entity, and perform one or more second operations based on the one or more data elements representing the property or tag.

Dynamic State

One implementation of the present disclosure is a building system including one or more memory devices including instructions thereon that, when executed by one or more processors, cause the one or more processors to perform one or more first operations based on a digital twin of a building to derive a state for an entity of the digital twin, the digital twin including representations of entities of the building and relationships between the entities. The instructions cause the one or more processors to update a schema of the digital twin by adding a state type of the state to an entity class of the schema, add, based on the schema, one or more data elements representing the state to the digital twin, the one or more data elements related to the entity of the entity class, and perform one or more second operations based on the one or more data elements representing the state.

In some embodiments, the entities include at least one of a person, point, location, or event, wherein the schema defines entity classes for entity types of the entities.

In some embodiments, the entities are instances of entity classes defined by the schema.

In some embodiments, the instructions cause the one or more processors to update the schema of the digital twin while the digital twin is deployed without requiring the digital twin to be redeployed.

In some embodiments, the schema defines entity classes, the entity classes indicating properties, tags, and states for the entity classes.

In some embodiments, the instructions cause the one or more processors to perform the one or more first operations based on the digital twin of the building and external data collected from an external system, wherein the state is derived from the external data for the entity of the digital twin.

In some embodiments, the instructions cause the one or more processors to receive an indication to add the state to the entity, identify the entity class of the entity based on the schema, update the schema of the digital twin by adding the state type to the entity class of the schema responsive to identifying that a class of the entity is the entity class, and add based on the schema, the one or more nodes representing the state to the digital twin, the one or more nodes related to a second node representing a second entity of the entity class, wherein the entity is different from the second entity.

In some embodiments, an application begins operating to perform the one or more first operations based on the digital twin of the building to derive the state for the entity after the digital twin is deployed and before the schema of the digital twin is updated.

In some embodiments, the instructions are configured to receive an output from the application resulting from the one or more first operations, the output indicating the state, search the schema of the digital twin to determine whether the schema includes the state type indicated by the output of the one or more first operations, and update the schema of the digital twin by adding the state type of the state to the entity class of the schema responsive to identifying that the schema does not include the state type.

In some embodiments, the state defines a condition associated with the entity.

In some embodiments, the state is at least one of a fault state of a piece of equipment of the building or an occupancy level of a space of the building.

In some embodiments, the digital twin includes nodes and edges between the nodes, the nodes representing the entities of the building and the edges indicating the relationships between the entities. In some embodiments, the instructions cause the one or more processors to add, based on the schema, one or more nodes representing the state to the digital twin, the one or more nodes related to the entity of the entity class by one or more relationships.

Another implementation of the present disclosure is a method including performing, by one or more processing circuits, one or more first operations based on a digital twin of a building to derive a state for an entity of the digital twin, the digital twin including representations of entities of the building and relationships between the entities and updating, by one or more processing circuits, a schema of the digital twin by adding a state type of the state to an entity class of the schema. The method includes adding, by one or more processing circuits, based on the schema, one or more data elements representing the state to the digital twin, the one or more data elements related to a node representing the entity of the entity class and performing, by one or more processing circuits, one or more second operations based on the one or more data elements representing the state.

In some embodiments, the entities include at least one of a person, point, location, or event, wherein the schema defines entity classes for entity types of the entities. In some embodiments, the entities are instances of entity classes defined by the schema.

In some embodiments, the method includes updating, by one or more processing circuits, the schema of the digital twin while the digital twin is deployed without requiring the digital twin to be redeployed.

In some embodiments, the schema defines entity classes, the entity classes indicating properties, tags, and states for the entity classes.

In some embodiments, the method includes performing, by one or more processing circuits, the one or more first operations based on the digital twin of the building and external data collected from an external system, wherein the state is derived from the external data for the entity of the digital twin.

In some embodiments, the digital twin includes nodes and edges between the nodes, the nodes representing the entities of the building and the edges indicating the relationships between the entities. In some embodiments, the method includes adding, by the one or more processing circuits, based on the schema, one or more nodes representing the state to the digital twin, the one or more nodes related to the entity of the entity class by one or more relationships.

In some embodiments, the method includes receiving, by one or more processing circuits, an indication to add the state to the entity, identifying, by one or more processing circuits, the entity class of the entity based on the schema, updating, by one or more processing circuits, the schema of the digital twin by adding the state type to the entity class of the schema responsive to identifying that a class of the entity is the entity class, and adding, by one or more processing circuits, based on the schema, the one or more nodes representing the state to the digital twin, the one or more nodes related to a second node representing a second entity of the entity class, wherein the entity is different from the second entity.

In some embodiments, an application begins operating to perform the one or more first operations based on the digital twin of the building to derive the state for the entity after the digital twin is deployed and before the schema of the digital twin is updated.

In some embodiments, the method includes receiving, by one or more processing circuits, an output from the application resulting from the one or more first operations, the output indicating the state, searching, by one or more processing circuits, the schema of the digital twin to determine whether the schema includes the state type indicated by the output of the one or more first operations, and updating, by one or more processing circuits, the schema of the digital twin by adding the state type of the state to the entity class of the schema responsive to identifying that the schema does not include the state type.

Another implementation of the present disclosure is a building system including one or more memory devices including instructions thereon and one or more processors configured to execute the instructions causing the one or more processors to perform one or more first operations based on a digital twin of a building to derive a state for an entity of the digital twin, the digital twin including representations of entities of the building and relationships between the entities. The instructions cause the one or more processors to update a schema of the digital twin by adding a state type of the state to an entity class of the schema, add, based on the schema, one or more data elements representing the state to the digital twin, the one or more data elements related to the entity of the entity class, and perform one or more second operations based on the one or more data elements representing the state.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Figure 1:
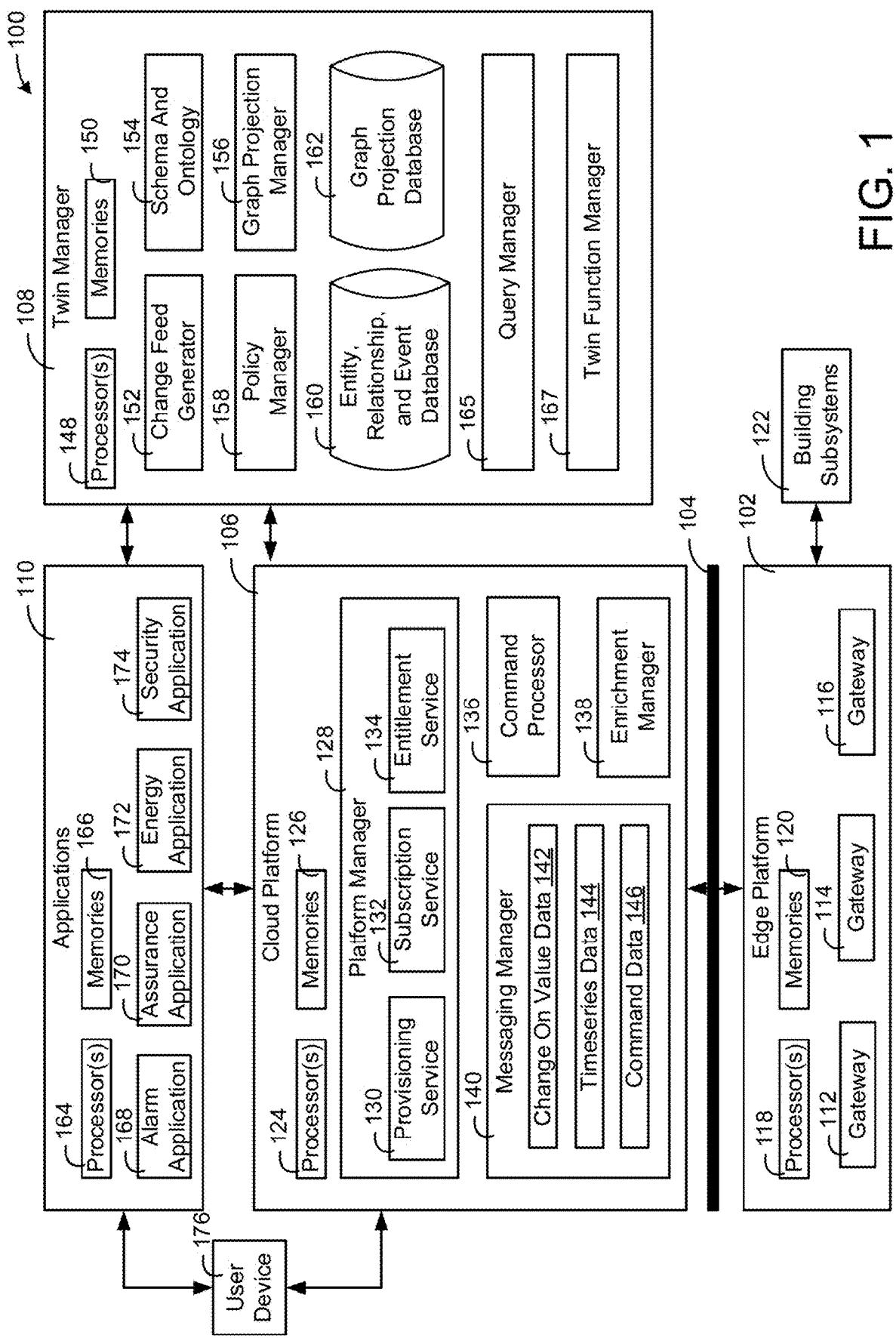
FIG. 1 is a block diagram of a building data platform including an edge platform, a cloud platform, and a twin manager, according to an exemplary embodiment.

Referring generally to the FIGURES, systems and methods for dynamic extensibility of properties, tags, and states in a schema of a digital twin is shown, according to various exemplary embodiments. A digital twin may provide a virtual representation of a building, e.g., both in terms of contextual information describing the building and telemetry data collected from equipment of the building. The digital twin may act as a replica illustrating the entities of the building (e.g., assets, people, points, locations, and events) and relationships between the various entities. The digital twin can, in some embodiments, be implemented in terms of a graph data structure.

In some embodiments, the entities and relationships between the entities can be defined in terms of a schema. The schema can define the entities, properties of the entities, tags of the entities, states of the entities, etc. in terms of a class structure where each entity includes specific corresponding properties, tags, or states. For example, any thermostat entity could include a temperature setpoint state, a current temperature state, a tag indicating when the equipment was last serviced, a property indicating that the thermostat includes a display device, properties indicating that the thermostat the types of inputs or outputs of the thermostat, etc. The schema could be a strongly typed schema such as BRICK, in some embodiments. BRICK is described in Brick: Towards a Unified Metadata Schema For Buildings by Balaji et al., which is incorporated by reference herein.

In some embodiments, a building system can extend the schema of the digital twin to accommodate for different properties, tags, and/or states. This extension can be performed at runtime such that the digital twin and/or the system running the digital twin can have changes made to the schema without requiring the digital twin and/or system running the digital twin to be redeployed and/or reconfigured (which would cause downtime). The digital twin schema can be extended dynamically by the building system, in some embodiments. For example, the building system can (during runtime) make determinations that new states, properties, or tags are needed that would increase the performance of the digital twin (e.g., allow for the digital twin to relate new important pieces of information to consuming systems). The building system can make these runtime updates to the schema of the digital twin.

In some embodiments, the updated schema of the digital twin, e.g., the new properties, tags, and/or states of the entities can be used by a system, application, and/or agent that operates against data of the digital twin. For example, such a system, application, and/or agent could search and filter the digital twin based on the new properties, tags, and/or states of the digital twin. The system, application, and/or agent could implement building temperature control, humidity control, air quality control, false alarm analysis, fault analysis, etc. based on the updated digital twin.

In some embodiments, a BIM viewer which may render BIM related information in a user interface based on the graph could operate based on the updated schema of the digital twin. BIM viewers are described with reference to U.S. Provisional Patent Application No. 63/214,217 filed Jun. 23, 2021, U.S. patent application Ser. No. 17/136,752 filed Dec. 29, 2020, U.S. patent application Ser. No. 17/136,768 filed Dec. 29, 2020, and U.S. patent application Ser. No. 17/136,785 filed Dec. 29, 2020, the entirety of each of which is incorporated by reference herein. The BIM viewer may not operate in the exact schema of the digital twin. Therefore, updates can be made to the schema to account for various pieces of information needed for the BIM viewer to operate properly. The BIM viewer could then query a graph of the digital twin in the updated schema based on tags, properties, states, and/or any other value added to the schema that may not exist in the original schema. The updated schema can allow for values or other information to be queried from the digital twin at runtime without the need to update applications, models, rebuilding and/or redeploying systems, data migration, etc.

In some embodiments, the building system can update the schema of the digital twin to allow new event types to be ingested and stored by the digital twin. For example, the building system can, in some embodiments, receive new events and determine whether the event types of the new events are not present in the schema of the digital twin. The building system can add the new event type to the schema of the digital twin responsive to detecting that the event type does not exist allowing events of the new event type to be added to the digital twin. Allowing the digital twin to extend its schema to account for new event types to any entity in the digital twin is the driving feature which allows plug and play functionality and lowers the barrier to consuming and extending the functionality of the digital twin.

Examples of digital twins and adding schema information to a schema based on received data information is shown and described in U.S. patent application Ser. No. 17/134,661 filed Dec. 28, 2020, U.S. patent application Ser. No. 17/134,664 filed Dec. 28, 2020, U.S. patent application Ser. No. 17/134,671 filed Dec. 28, 2020, U.S. patent application Ser. No. 17/134,659 filed Dec. 28, 2020, U.S. patent application Ser. No. 17/134,973 filed Dec. 28th, 2020, U.S. patent application Ser. No. 17/134,999 filed Dec. 28, 2020, U.S. patent application Ser. No. 17/135,023 filed Dec. 28, 2020, U.S. patent application Ser. No. 17/134,691 filed Dec. 28, 2020, U.S. patent application Ser. No. 17/135,056 filed Dec. 28, 2020, and U.S. patent application Ser. No. 17/135,009 filed Dec. 28, 2020, the entirety of each of these patent applications is incorporated by reference herein.

In some embodiments, adding a dynamic property or state to the schema may not necessarily cause the property or state to be propagated to other entities, e.g., it may not cause the creation of new properties or states for every entity of a schema class. For example, if an expected occupancy state is added for a "Conference Room ABC" entity, in some cases, a conference room schema class for the "Conference Room ABC" can be updated with the expected occupancy state (or a new schema for the "Conference Room ABC" could be created to handle the new state). The building system may not add the expected occupancy state to other conference room entities of the conference room schema class that exist (but may add the occupancy state to future entities of the conference room schema class as when the entities are created).

In some embodiments, the propagation of newly added properties and/or states across entities of a schema type can be controlled by a user. For example, a user could set a setting for the building system that the addition of a new property or state to a particular entity of a particular schema class causes the creation of a new schema class with the new property or state for the particular entity. This would stop the propagation of a new property to other entities. In some embodiments, a user could set a setting that the addition of a new property or state to a particular entity of a particular schema class cause the addition of the new property or state to all entities of the particular entity class. This would cause the propagation of the new property to other entities.

Referring now to FIG. 1, a building data platform 100 including an edge platform 102, a cloud platform 106, and a twin manager 108 are shown, according to an exemplary embodiment. The edge platform 102, the cloud platform 106, and the twin manager 108 can each be separate services deployed on the same or different computing systems. In some embodiments, the cloud platform 106 and the twin manager 108 are implemented in off premises computing systems, e.g., outside a building. The edge platform 102 can be implemented on-premises, e.g., within the building. However, any combination of on-premises and off-premises components of the building data platform 100 can be implemented.

The building data platform 100 includes applications 110. The applications 110 can be various applications that operate to manage the building subsystems 122. The applications 110 can be remote or on-premises applications (or a hybrid of both) that run on various computing systems. The applications 110 can include an alarm application 168 configured to manage alarms for the building subsystems 122. The applications 110 include an assurance application 170 that implements assurance services for the building subsystems 122. In some embodiments, the applications 110 include an energy application 172 configured to manage the energy usage of the building subsystems 122. The applications 110 include a security application 174 configured to manage security systems of the building.

In some embodiments, the applications 110 and/or the cloud platform 106 interacts with a user device 176. In some embodiments, a component or an entire application of the applications 110 runs on the user device 176. The user device 176 may be a laptop computer, a desktop computer, a smartphone, a tablet, and/or any other device with an input interface (e.g., touch screen, mouse, keyboard, etc.) and an output interface (e.g., a speaker, a display, etc.).

The applications 110, the twin manager 108, the cloud platform 106, and the edge platform 102 can be implemented on one or more computing systems, e.g., on processors and/or memory devices. For example, the edge platform 102 includes processor(s) 118 and memories 120, the cloud platform 106 includes processor(s) 124 and memories 126, the applications 110 include processor(s) 164 and memories 166, and the twin manager 108 includes processor(s) 148 and memories 150.

The processors can be a general purpose or specific purpose processors, an application specific integrated circuit (ASIC), one or more field programmable gate arrays (FPGAs), a group of processing components, or other suitable processing components. The processors may be configured to execute computer code and/or instructions stored in the memories or received from other computer readable media (e.g., CDROM, network storage, a remote server, etc.).

The memories can include one or more devices (e.g., memory units, memory devices, storage devices, etc.) for storing data and/or computer code for completing and/or facilitating the various processes described in the present disclosure. The memories can include random access memory (RAM), read-only memory (ROM), hard drive storage, temporary storage, non-volatile memory, flash memory, optical memory, or any other suitable memory for storing software objects and/or computer instructions. The memories can include database components, object code components, script components, or any other type of information structure for supporting the various activities and information structures described in the present disclosure. The memories can be communicably connected to the processors and can include computer code for executing (e.g., by the processors) one or more processes described herein.

The edge platform 102 can be configured to provide connection to the building subsystems 122. The edge platform 102 can receive messages from the building subsystems 122 and/or deliver messages to the building subsystems 122. The edge platform 102 includes one or multiple gateways, e.g., the gateways 112-116. The gateways 112-116 can act as a gateway between the cloud platform 106 and the building subsystems 122. The gateways 112-116 can be the gateways described in U.S. Provisional Patent Application No. 62/951,897 filed Dec. 20th, 2019, the entirety of which is incorporated by reference herein. In some embodiments, the applications 110 can be deployed on the edge platform 102. In this regard, lower latency in management of the building subsystems 122 can be realized.

The edge platform 102 can be connected to the cloud platform 106 via a network 104. The network 104 can communicatively couple the devices and systems of building data platform 100. In some embodiments, the network 104 is at least one of and/or a combination of a Wi-Fi network, a wired Ethernet network, a ZigBee network, a Bluetooth network, and/or any other wireless network. The network 104 may be a local area network or a wide area network (e.g., the Internet, a building WAN, etc.) and may use a variety of communications protocols (e.g., BACnet, IP, LON, etc.). The network 104 may include routers, modems, servers, cell towers, satellites, and/or network switches. The network 104 may be a combination of wired and wireless networks.

The cloud platform 106 can be configured to facilitate communication and routing of messages between the applications 110, the twin manager 108, the edge platform 102, and/or any other system. The cloud platform 106 can include a platform manager 128, a messaging manager 140, a command processor 136, and an enrichment manager 138. In some embodiments, the cloud platform 106 can facilitate messaging between the building data platform 100 via the network 104.

The messaging manager 140 can be configured to operate as a transport service that controls communication with the building subsystems 122 and/or any other system, e.g., managing commands to devices (C2D), commands to connectors (C2C) for external systems, commands from the device to the cloud (D2C), and/or notifications. The messaging manager 140 can receive different types of data from the applications 110, the twin manager 108, and/or the edge platform 102. The messaging manager 140 can receive change on value data 142, e.g., data that indicates that a value of a point has changed. The messaging manager 140 can receive timeseries data 144, e.g., a time correlated series of data entries each associated with a particular time stamp. Furthermore, the messaging manager 140 can receive command data 146. All of the messages handled by the cloud platform 106 can be handled as an event, e.g., the data 142-146 can each be packaged as an event with a data value occurring at a particular time (e.g., a temperature measurement made at a particular time).

The cloud platform 106 includes a command processor 136. The command processor 136 can be configured to receive commands to perform an action from the applications 110, the building subsystems 122, the user device 176, etc. The command processor 136 can manage the commands, determine whether the commanding system is authorized to perform the particular commands, and communicate the commands to the commanded system, e.g., the building subsystems 122 and/or the applications 110. The commands could be a command to change an operational setting that control environmental conditions of a building, a command to run analytics, etc.

The cloud platform 106 includes an enrichment manager 138. The enrichment manager 138 can be configured to enrich the events received by the messaging manager 140. The enrichment manager 138 can be configured to add contextual information to the events. The enrichment manager 138 can communicate with the twin manager 108 to retrieve the contextual information. In some embodiments, the contextual information is an indication of information related to the event. For example, if the event is a timeseries temperature measurement of a thermostat, contextual information such as the location of the thermostat (e.g., what room), the equipment controlled by the thermostat (e.g., what VAV), etc. can be added to the event. In this regard, when a consuming application, e.g., one of the applications 110 receives the event, the consuming application can operate based on the data of the event, the temperature measurement, and also the contextual information of the event.

The enrichment manager 138 can solve a problem that when a device produces a significant amount of information, the information may contain simple data without context. An example might include the data generated when a user scans a badge at a badge scanner of the building subsystems 122. This physical event can generate an output event including such information as "DeviceBadgeScannerID," "BadgeID," and/or "Date/Time." However, if a system sends this data to a consuming application, e.g., Consumer A and a Consumer B, each customer may need to call the building data platform knowledge service to query information with queries such as, "What space, build, floor is that badge scanner in?" or "What user is associated with that badge?"

By performing enrichment on the data feed, a system can be able to perform inferences on the data. A result of the enrichment may be transformation of the message "DeviceBadgeScannerId, BadgeId, Date/Time," to "Region, Building, Floor, Asset, DeviceId, BadgeId, UserName, EmployeeId, Date/Time Scanned." This can be a significant optimization, as a system can reduce the number of calls by 1/n, where n is the number of consumers of this data feed.

By using this enrichment, a system can also have the ability to filter out undesired events. If there are 100 building in a campus that receive 100,000 events per building each hour, but only 1 building is actually commissioned, only 1/10 of the events are enriched. By looking at what events are enriched and what events are not enriched, a system can do traffic shaping of forwarding of these events to reduce the cost of forwarding events that no consuming application wants or reads.

An example of an event received by the enrichment manager 138 may be:
i.{
ii."id": "someguid",
iii."eventType": "Device_Heartbeat",
iv."eventTime": "2018-01-27T00:00:00+00:00"
v."eventValue": 1,
vi."deviceID": "someguid"
vii.}

An example of an enriched event generated by the enrichment manager 138 may be:
i.{
ii."id": "someguid",
iii."eventType": "Device_Heartbeat",
iv."eventTime": "2018-01-27T00:00:00+00:00"
v."eventValue": 1,
vi."deviceID": "someguid",
vii."buildingName": "Building-48",
viii."buildingID": "SomeGuid",
ix. "panelID": "SomeGuid",
x."panelName": "Building-48-Panel-13",
xi."cityID": 371,
xii."cityName": "Milwaukee",
xiii."stateID": 48,
xiv."stateName": "Wisconsin (WI)",
xv."countryID": 1,
xvi."country Name": "United States"
xvii.}

By receiving enriched events, an application of the applications 110 can be able to populate and/or filter what events are associated with what areas. Furthermore, user interface generating applications can generate user interfaces that include the contextual information based on the enriched events.

The cloud platform 106 includes a platform manager 128. The platform manager 128 can be configured to manage the users and/or subscriptions of the cloud platform 106. For example, what subscribing building, user, and/or tenant utilizes the cloud platform 106. The platform manager 128 includes a provisioning service 130 configured to provision the cloud platform 106, the edge platform 102, and the twin manager 108. The platform manager 128 includes a subscription service 132 configured to manage a subscription of the building, user, and/or tenant while the entitlement service 134 can track entitlements of the buildings, users, and/or tenants.

The twin manager 108 can be configured to manage and maintain a digital twin. The digital twin can be a digital representation of the physical environment, e.g., a building. The twin manager 108 can include a change feed generator 152, a schema and ontology 154, a projection manager 156, a policy manager 158, an entity, relationship, and event database 160, and a graph projection database 162.

The graph projection manager 156 can be configured to construct graph projections and store the graph projections in the graph projection database 162. Examples of graph projections are shown in FIGS. 11-13. Entities, relationships, and events can be stored in the database 160. The graph projection manager 156 can retrieve entities, relationships, and/or events from the database 160 and construct a graph projection based on the retrieved entities, relationships and/or events. In some embodiments, the database 160 includes an entity-relationship collection for multiple subscriptions.

In some embodiment, the graph projection manager 156 generates a graph projection for a particular user, application, subscription, and/or system. In this regard, the graph projection can be generated based on policies for the particular user, application, and/or system in addition to an ontology specific for that user, application, and/or system. In this regard, an entity could request a graph projection and the graph projection manager 156 can be configured to generate the graph projection for the entity based on policies and an ontology specific to the entity. The policies can indicate what entities, relationships, and/or events the entity has access to. The ontology can indicate what types of relationships between entities the requesting entity expects to see, e.g., floors within a building, devices within a floor, etc. Another requesting entity may have an ontology to see devices within a building and applications for the devices within the graph.

The graph projections generated by the graph projection manager 156 and stored in the graph projection database 162 can be a knowledge graph and is an integration point. For example, the graph projections can represent floor plans and systems associated with each floor. Furthermore, the graph projections can include events, e.g., telemetry data of the building subsystems 122. The graph projections can show application services as nodes and API calls between the services as edges in the graph. The graph projections can illustrate the capabilities of spaces, users, and/or devices. The graph projections can include indications of the building subsystems 122, e.g., thermostats, cameras, VAVs, etc. The graph projection database 162 can store graph projections that keep up a current state of a building.

The graph projections of the graph projection database 162 can be digital twins of a building. Digital twins can be digital replicas of physical entities that enable an in-depth analysis of data of the physical entities and provide the potential to monitor systems to mitigate risks, manage issues, and utilize simulations to test future solutions. Digital twins can play an important role in helping technicians find the root cause of issues and solve problems faster, in supporting safety and security protocols, and in supporting building managers in more efficient use of energy and other facilities resources. Digital twins can be used to enable and unify security systems, employee experience, facilities management, sustainability, etc.

In some embodiments the enrichment manager 138 can use a graph projection of the graph projection database 162 to enrich events. In some embodiments, the enrichment manager 138 can identify nodes and relationships that are associated with, and are pertinent to, the device that generated the event. For example, the enrichment manager 138 could identify a thermostat generating a temperature measurement event within the graph. The enrichment manager 138 can identify relationships between the thermostat and spaces, e.g., a zone that the thermostat is located in. The enrichment manager 138 can add an indication of the zone to the event.

Furthermore, the command processor 136 can be configured to utilize the graph projections to command the building subsystems 122. The command processor 136 can identify a policy for a commanding entity within the graph projection to determine whether the commanding entity has the ability to make the command. For example, the command processor 136, before allowing a user to make a command, determine, based on the graph projection database 162, to determine that the user has a policy to be able to make the command.

In some embodiments, the policies can be conditional based policies. For example, the building data platform 100 can apply one or more conditional rules to determine whether a particular system has the ability to perform an action. In some embodiments, the rules analyze a behavioral based biometric. For example, a behavioral based biometric can indicate normal behavior and/or normal behavior rules for a system. In some embodiments, when the building data platform 100 determines, based on the one or more conditional rules, that an action requested by a system does not match a normal behavior, the building data platform 100 can deny the system the ability to perform the action and/or request approval from a higher level system.

For example, a behavior rule could indicate that a user has access to log into a system with a particular IP address between 8 A.M. through 5 P.M. However, if the user logs in to the system at 7 P.M., the building data platform 100 may contact an administrator to determine whether to give the user permission to log in.

The change feed generator 152 can be configured to generate a feed of events that indicate changes to the digital twin, e.g., to the graph. The change feed generator 152 can track changes to the entities, relationships, and/or events of the graph. For example, the change feed generator 152 can detect an addition, deletion, and/or modification of a node or edge of the graph, e.g., changing the entities, relationships, and/or events within the database 160. In response to detecting a change to the graph, the change feed generator 152 can generate an event summarizing the change. The event can indicate what nodes and/or edges have changed and how the nodes and edges have changed. The events can be posted to a topic by the change feed generator 152.

The change feed generator 152 can implement a change feed of a knowledge graph. The building data platform 100 can implement a subscription to changes in the knowledge graph. When the change feed generator 152 posts events in the change feed, subscribing systems or applications can receive the change feed event. By generating a record of all changes that have happened, a system can stage data in different ways, and then replay the data back in whatever order the system wishes. This can include running the changes sequentially one by one and/or by jumping from one major change to the next. For example, to generate a graph at a particular time, all change feed events up to the particular time can be used to construct the graph.

The change feed can track the changes in each node in the graph and the relationships related to them, in some embodiments. If a user wants to subscribe to these changes and the user has proper access, the user can simply submit a web API call to have sequential notifications of each change that happens in the graph. A user and/or system can replay the changes one by one to reinstitute the graph at any given time slice. Even though the messages are "thin" and only include notification of change and the reference "id/seq id," the change feed can keep a copy of every state of each node and/or relationship so that a user and/or system can retrieve those past states at any time for each node. Furthermore, a consumer of the change feed could also create dynamic "views" allowing different "snapshots" in time of what the graph looks like from a particular context. While the twin manager 108 may contain the history and the current state of the graph based upon schema evaluation, a consumer can retain a copy of that data, and thereby create dynamic views using the change feed.

The schema and ontology 154 can define the message schema and graph ontology of the twin manager 108. The message schema can define what format messages received by the messaging manager 140 should have, e.g., what parameters, what formats, etc. The ontology can define graph projections, e.g., the ontology that a user wishes to view. For example, various systems, applications, and/or users can be associated with a graph ontology. Accordingly, when the graph projection manager 156 generates an graph projection for a user, system, or subscription, the graph projection manager 156 can generate a graph projection according to the ontology specific to the user. For example, the ontology can define what types of entities are related in what order in a graph, for example, for the ontology for a subscription of "Customer A," the graph projection manager 156 can create relationships for a graph projection based on the rule:

Region←→Building←→Floor←→Space←→Asset

For the ontology of a subscription of "Customer B," the graph projection manager 156 can create relationships based on the rule:

Building←─→Floor←─→Asset

The policy manager 158 can be configured to respond to requests from other applications and/or systems for policies. The policy manager 158 can consult a graph projection to determine what permissions different applications, users, and/or devices have. The graph projection can indicate various permissions that different types of entities have and the policy manager 158 can search the graph projection to identify the permissions of a particular entity. The policy manager 158 can facilitate fine grain access control with user permissions. The policy manager 158 can apply permissions across a graph, e.g., if "user can view all data associated with floor 1" then they see all subsystem data for that floor, e.g., surveillance cameras, HVAC devices, fire detection and response devices, etc.

The twin manager 108 includes a query manager 165 and a twin function manager 167. The query manger 164 can be configured to handle queries received from a requesting system, e.g., the user device 176, the applications 110, and/or any other system. The query manager 165 can receive queries that include query parameters and context. The query manager 165 can query the graph projection database 162 with the query parameters to retrieve a result. The query manager 165 can then cause an event processor, e.g., a twin function, to operate based on the result and the context. In some embodiments, the query manager 165 can select the twin function based on the context and/or perform operates based on the context. In some embodiments, the query manager 165 is configured to perform the operations described with reference to FIGS. 5-10.

The twin function manager 167 can be configured to manage the execution of twin functions. The twin function manager 167 can receive an indication of a context query that identifies a particular data element and/or pattern in the graph projection database 162. Responsive to the particular data element and/or pattern occurring in the graph projection database 162 (e.g., based on a new data event added to the graph projection database 162 and/or change to nodes or edges of the graph projection database 162, the twin function manager 167 can cause a particular twin function to execute. The twin function can execute based on an event, context, and/or rules. The event can be data that the twin function executes against. The context can be information that provides a contextual description of the data, e.g., what device the event is associated with, what control point should be updated based on the event, etc. The twin function manager 167 can be configured to perform the operations of the FIGS. 11-15.

Figure 2:
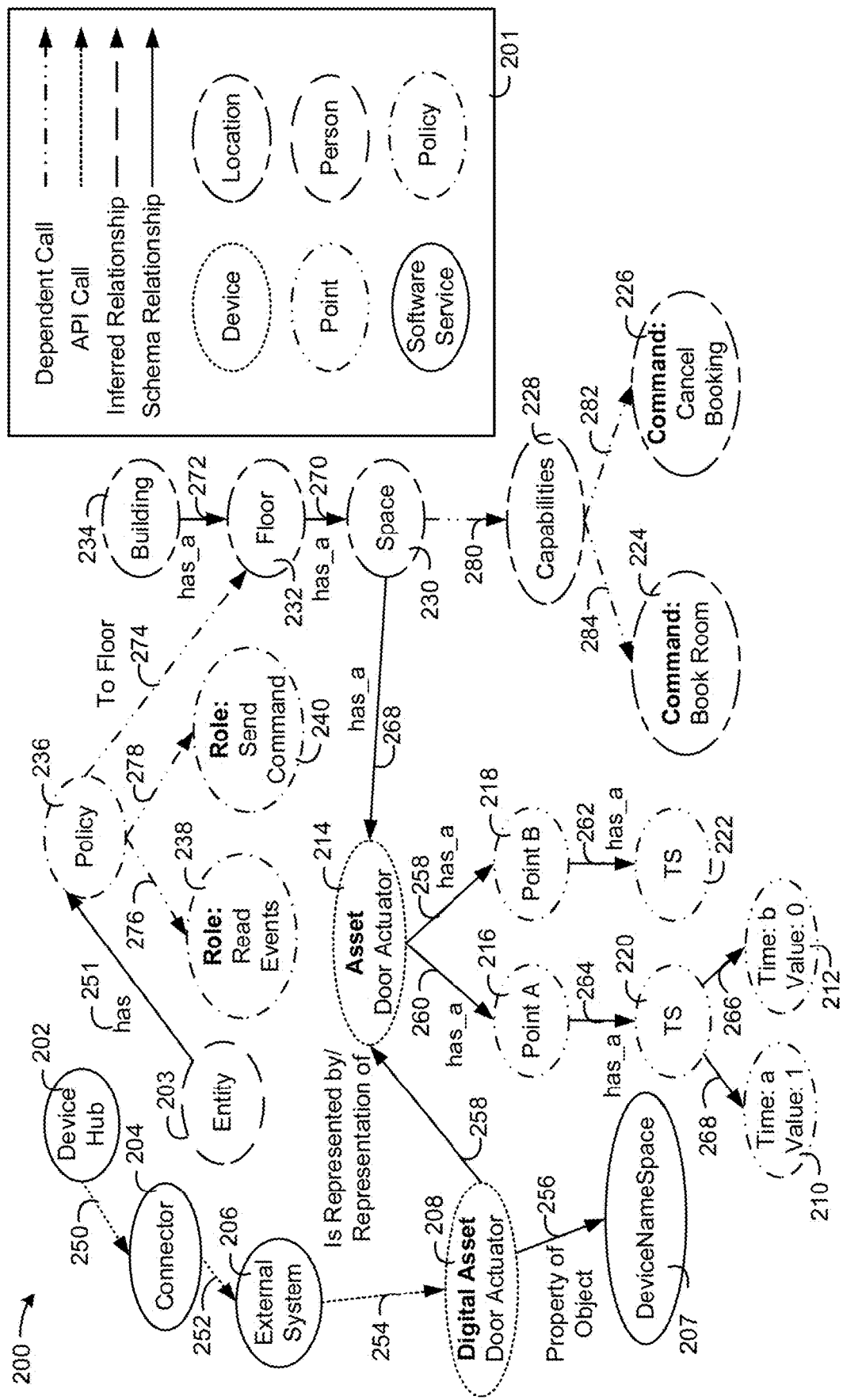
FIG. 2 is a graph projection of the twin manager of FIG. 1 including application programming interface (API) data, capability data, policy data, and services, according to an exemplary embodiment.

Referring now to FIG. 2, a graph projection 200 of the twin manager 108 including application programming interface (API) data, capability data, policy data, and services is shown, according to an exemplary embodiment. The graph projection 200 includes nodes 202-240 and edges 250-272. The nodes 202-240 and the edges 250-272 are defined according to the key 201. The nodes 202-240 represent different types of entities, devices, locations, points, persons, policies, and software services (e.g., API services). The edges 250-272 represent relationships between the nodes 202-240, e.g., dependent calls, API calls, inferred relationships, and schema relationships (e.g., BRICK relationships).

The graph projection 200 includes a device hub 202 which may represent a software service that facilitates the communication of data and commands between the cloud platform 106 and a device of the building subsystems 122, e.g., door actuator 214. The device hub 202 is related to a connector 204, an external system 206, and a digital asset "Door Actuator" 208 by edge 250, edge 252, and edge 254.

The cloud platform 106 can be configured to identify the device hub 202, the connector 204, the external system 206 related to the door actuator 214 by searching the graph projection 200 and identifying the edges 250-254 and edge 258. The graph projection 200 includes a digital representation of the "Door Actuator," node 208. The digital asset "Door Actuator" 208 includes a "DeviceNameSpace" represented by node 207 and related to the digital asset "Door Actuator" 208 by the "Property of Object" edge 256.

The "Door Actuator" 214 has points and timeseries. The "Door Actuator" 214 is related to "Point A" 216 by a "has_a" edge 260. The "Door Actuator" 214 is related to "Point B" 218 by a "has_A" edge 258. Furthermore, timeseries associated with the points A and B are represented by nodes "TS" 220 and "TS" 222. The timeseries are related to the points A and B by "has_a" edge 264 and "has_a" edge 262. The timeseries "TS" 220 has particular samples, sample 210 and 212 each related to "TS" 220 with edges 268 and 266 respectively. Each sample includes a time and a value. Each sample may be an event received from the door actuator that the cloud platform 106 ingests into the entity, relationship, and event database 160, e.g., ingests into the graph projection 200.

The graph projection 200 includes a building 234 representing a physical building. The building includes a floor represented by floor 232 related to the building 234 by the "has_a" edge from the building 234 to the floor 232. The floor has a space indicated by the edge "has_a" 270 between the floor 232 and the space 230. The space has particular capabilities, e.g., is a room that can be booked for a meeting, conference, private study time, etc. Furthermore, the booking can be canceled. The capabilities for the floor 232 are represented by capabilities 228 related to space 230 by edge 280. The capabilities 228 are related to two different commands, command "book room" 224 and command "cancel booking" 226 related to capabilities 228 by edge 284 and edge 282 respectively.

If the cloud platform 106 receives a command to book the space represented by the node, space 230, the cloud platform 106 can search the graph projection 200 for the capabilities for the 228 related to the space 230 to determine whether the cloud platform 106 can book the room.

In some embodiments, the cloud platform 106 could receive a request to book a room in a particular building, e.g., the building 234. The cloud platform 106 could search the graph projection 200 to identify spaces that have the capabilities to be booked, e.g., identify the space 230 based on the capabilities 228 related to the space 230. The cloud platform 106 can reply to the request with an indication of the space and allow the requesting entity to book the space 230.

The graph projection 200 includes a policy 236 for the floor 232. The policy 236 is related set for the floor 232 based on a "To Floor" edge 274 between the policy 236 and the floor 232. The policy 236 is related to different roles for the floor 232, read events 238 via edge 276 and send command 240 via edge 278. The policy 236 is set for the entity 203 based on has edge 251 between the entity 203 and the policy 236.

The twin manager 108 can identify policies for particular entities, e.g., users, software applications, systems, devices, etc. based on the policy 236. For example, if the cloud platform 106 receives a command to book the space 230. The cloud platform 106 can communicate with the twin manager 108 to verify that the entity requesting to book the space 230 has a policy to book the space. The twin manager 108 can identify the entity requesting to book the space as the entity 203 by searching the graph projection 200. Furthermore, the twin manager 108 can further identify the edge has 251 between the entity 203 and the policy 236 and the edge 1178 between the policy 236 and the command 240.

Furthermore, the twin manager 108 can identify that the entity 203 has the ability to command the space 230 based on the edge 1174 between the policy 236 and the edge 270 between the floor 232 and the space 230. In response to identifying the entity 203 has the ability to book the space 230, the twin manager 108 can provide an indication to the cloud platform 106.

Furthermore, if the entity makes a request to read events for the space 230, e.g., the sample 210 and the sample 212, the twin manager 108 can identify the edge has 251 between the entity 203 and the policy 236, the edge 1178 between the policy 236 and the read events 238, the edge 1174 between the policy 236 and the floor 232, the "has_a" edge 270 between the floor 232 and the space 230, the edge 268 between the space 230 and the door actuator 214, the edge 260 between the door actuator 214 and the point A 216, the "has_a" edge 264 between the point A 216 and the TS 220, and the edges 268 and 266 between the TS 220 and the samples 210 and 212 respectively.

Figure 3:
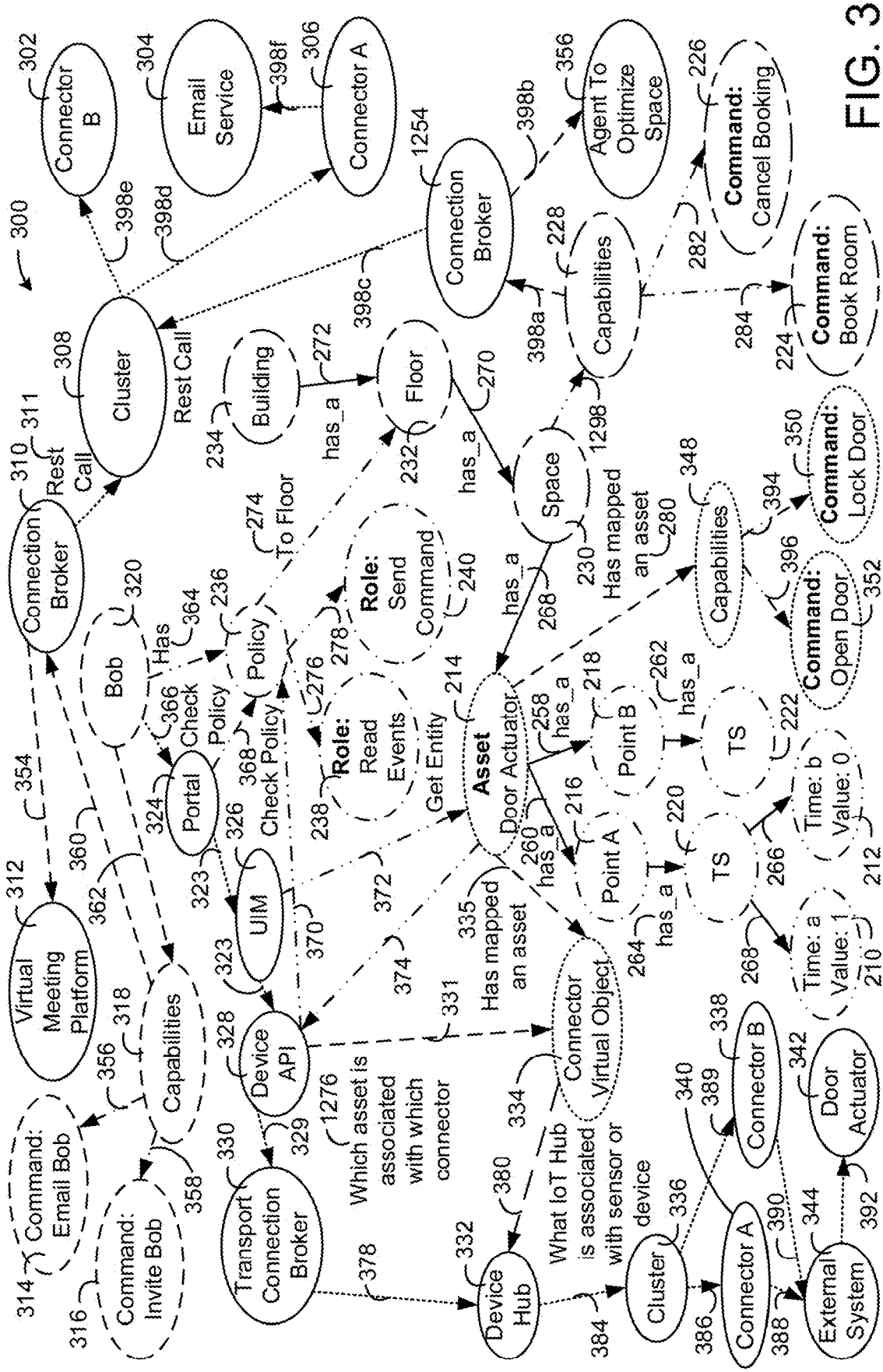
FIG. 3 is another graph projection of the twin manager of FIG. 1 including application programming interface (API) data, capability data, policy data, and services, according to an exemplary embodiment.

Referring now to FIG. 3, a graph projection 300 of the twin manager 108 including application programming interface (API) data, capability data, policy data, and services is shown, according to an exemplary embodiment. The graph projection 300 includes the nodes and edges described in the graph projection 200 of FIG. 2. The graph projection 300 includes a connection broker 354 related to capabilities 228 by edge 398a. The connection broker 354 can be a node representing a software application configured to facilitate a connection with another software application. In some embodiments, the cloud platform 106 can identify the system that implements the capabilities 228 by identifying the edge 398a between the capabilities 228 and the connection broker 354.

The connection broker 354 is related to an agent that optimizes a space 356 via edge 398b. The agent represented by the node 356 can book and cancel bookings for the space represented by the node 230 based on the edge 398b between the connection broker 354 and the node 356 and the edge 398a between the capabilities 228 and the connection broker 354.

The connection broker 354 is related to a cluster 308 by edge 398c. Cluster 308 is related to connector B 302 via edge 398e and connector A 306 via edge 398d. The connector A 306 is related to an external subscription service 304. A connection broker 310 is related to cluster 308 via an edge 311 representing a rest call that the connection broker represented by node 310 can make to the cluster represented by cluster 308.

The connection broker 310 is related to a virtual meeting platform 312 by an edge 354. The node 312 represents an external system that represents a virtual meeting platform. The connection broker represented by node 310 can represent a software component that facilitates a connection between the cloud platform 106 and the virtual meeting platform represented by node 312. When the cloud platform 106 needs to communicate with the virtual meeting platform represented by the node 312, the cloud platform 106 can identify the edge 354 between the connection broker 310 and the virtual meeting platform 312 and select the connection broker represented by the node 310 to facilitate communication with the virtual meeting platform represented by the node 312.

A capabilities node 318 can be connected to the connection broker 310 via edge 360. The capabilities 318 can be capabilities of the virtual meeting platform represented by the node 312 and can be related to the node 312 through the edge 360 to the connection broker 310 and the edge 354 between the connection broker 310 and the node 312. The capabilities 318 can define capabilities of the virtual meeting platform represented by the node 312. The node 320 is related to capabilities 318 via edge 362. The capabilities may be an invite bob command represented by node 316 and an email bob command represented by node 314. The capabilities 318 can be linked to a node 320 representing a user, Bob. The cloud platform 106 can facilitate email commands to send emails to the user Bob via the email service represented by the node 304. The node 304 is related to the connect a node 306 via edge 398f. Furthermore, the cloud platform 106 can facilitate sending an invite for a virtual meeting via the virtual meeting platform represented by the node 312 linked to the node 318 via the edge 358.

The node 320 for the user Bob can be associated with the policy 236 via the "has" edge 364. Furthermore, the node 320 can have a "check policy" edge 366 with a portal node 324. The device API node 328 has a check policy edge 370 to the policy node 236. The portal node 324 has an edge 368 to the policy node 236. The portal node 324 has an edge 323 to a node 326 representing a user input manager (UIM). The portal node 324 is related to the UIM node 326 via an edge 323. The UIM node 326 has an edge 323 to a device API node 328. The UIM node 326 is related to the door actuator node 214 via edge 372. The door actuator node 214 has an edge 374 to the device API node 328. The door actuator 214 has an edge 335 to the connector virtual object 334. The device hub 332 is related to the connector virtual object via edge 380. The device API node 328 can be an API for the door actuator 214. The connector virtual object 334 is related to the device API node 328 via the edge 331.

The device API node 328 is related to a transport connection broker 330 via an edge 329. The transport connection broker 330 is related to a device hub 332 via an edge 378. The device hub represented by node 332 can be a software component that hands the communication of data and commands for the door actuator 214. The cloud platform 106 can identify where to store data within the graph projection 300 received from the door actuator by identifying the nodes and edges between the points 216 and 218 and the device hub node 332. Similarly, the cloud platform 308 can identify commands for the door actuator that can be facilitated by the device hub represented by the node 332, e.g., by identifying edges between the device hub node 332 and an open door node 352 and an lock door node 350. The door actuator 114 has an edge "has mapped an asset" 280 between the node 214 and a capabilities node 348. The capabilities node 348 and the nodes 352 and 350 are linked by edges 396 and 394.

The device hub 332 is linked to a cluster 336 via an edge 384. The cluster 336 is linked to connector A 340 and connector B 338 by edges 386 and the edge 389. The connector A 340 and the connector B 338 is linked to an external system 344 via edges 388 and 390. The external system 344 is linked to a door actuator 342 via an edge 392.

Figure 4:
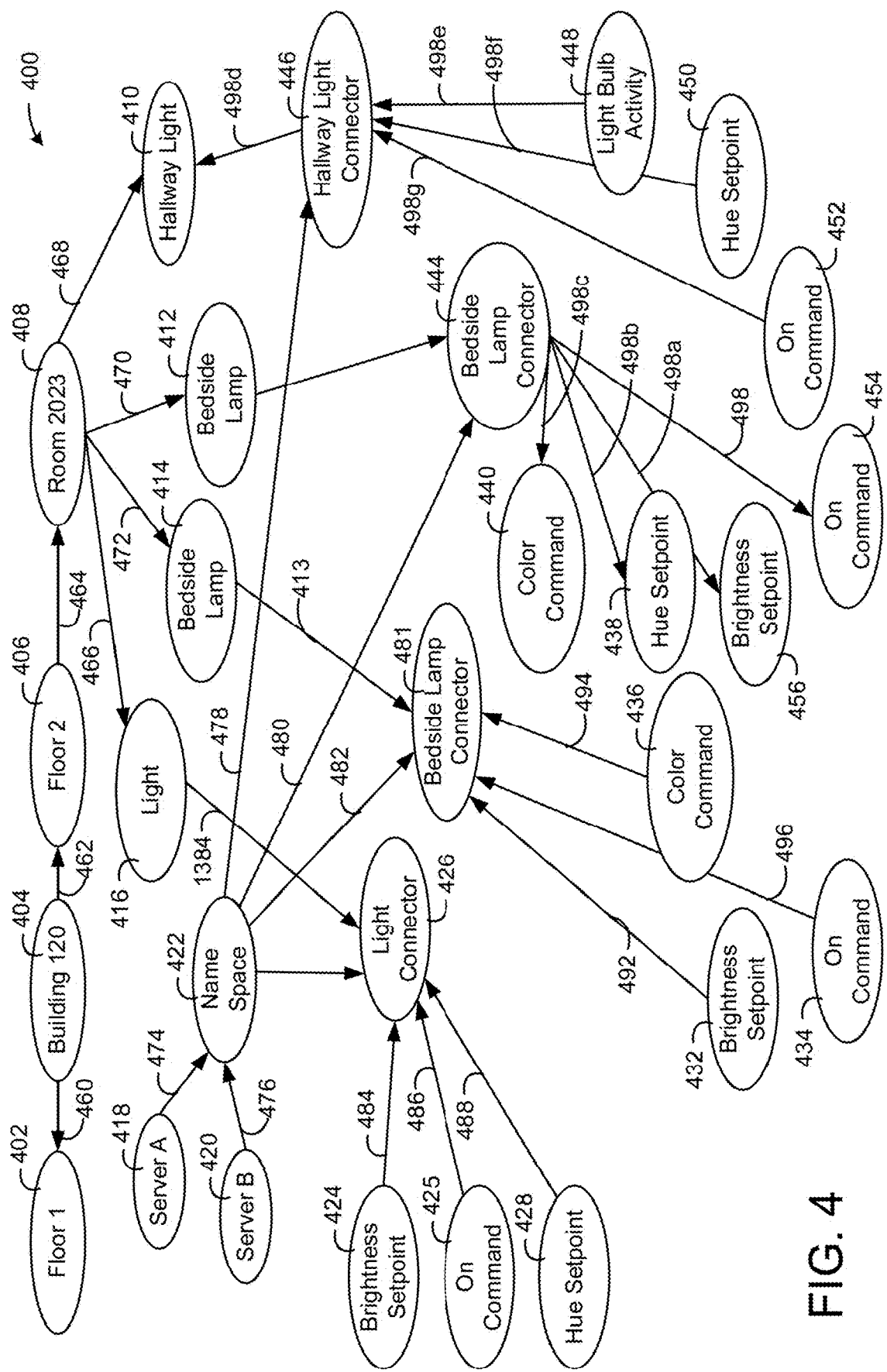
FIG. 4 is a graph projection of the twin manager of FIG. 1 including equipment and capability data for the equipment, according to an exemplary embodiment.

Referring now to FIG. 4, a graph projection 400 of the twin manager 108 including equipment and capability data for the equipment is shown, according to an exemplary embodiment. The graph projection 400 includes nodes 402-

456 and edges 360-498f. The cloud platform 106 can search the graph projection 400 to identify capabilities of different pieces of equipment.

A building node 404 represents a particular building that includes two floors. A floor 1 node 402 is linked to the building node 404 via edge 460 while a floor 2 node 406 is linked to the building node 404 via edge 462. The floor 2 includes a particular room 2023 represented by edge 464 between floor 2 node 406 and room 2023 node 408. Various pieces of equipment are included within the room 2023. A light represented by light node 416, a bedside lamp node 414, a bedside lamp node 412, and a hallway light node 410 are related to room 2023 node 408 via edge 466, edge 472, edge 470, and edge 468.

The light represented by light node 416 is related to a light connector 426 via edge 484. The light connector 426 is related to multiple commands for the light represented by the light node 416 via edges 484, 486, and 488. The commands may be a brightness setpoint 424, an on command 425, and a hue setpoint 428. The cloud platform 106 can receive a request to identify commands for the light represented by the light 416 and can identify the nodes 424-428 and provide an indication of the commands represented by the node 424-428 to the requesting entity. The requesting entity can then send commands for the commands represented by the nodes 424-428.

The bedside lamp node 414 is linked to a bedside lamp connector 481 via an edge 413. The connector 481 is related to commands for the bedside lamp represented by the bedside lamp node 414 via edges 492, 496, and 494. The command nodes are a brightness setpoint node 432, an on command node 434, and a color command 436. The hallway light 410 is related to a hallway light connector 446 via an edge 498d. The hallway light connector 446 is linked to multiple commands for the hallway light node 410 via edges 498g, 498f, and 498e. The commands are represented by an on command node 452, a hue setpoint node 450, and a light bulb activity node 448.

The graph projection 400 includes a name space node 422 related to a server A node 418 and a server B node 420 via edges 474 and 476. The name space node 422 is related to the bedside lamp connector 481, the bedside lamp connector 444, and the hallway light connector 446 via edges 482, 480, and 478. The bedside lamp connector 444 is related to commands, e.g., the color command node 440, the hue setpoint command 438, a brightness setpoint command 456, and an on command 454 via edges 498c, 498b, 498a, and 498.

Figure 5:
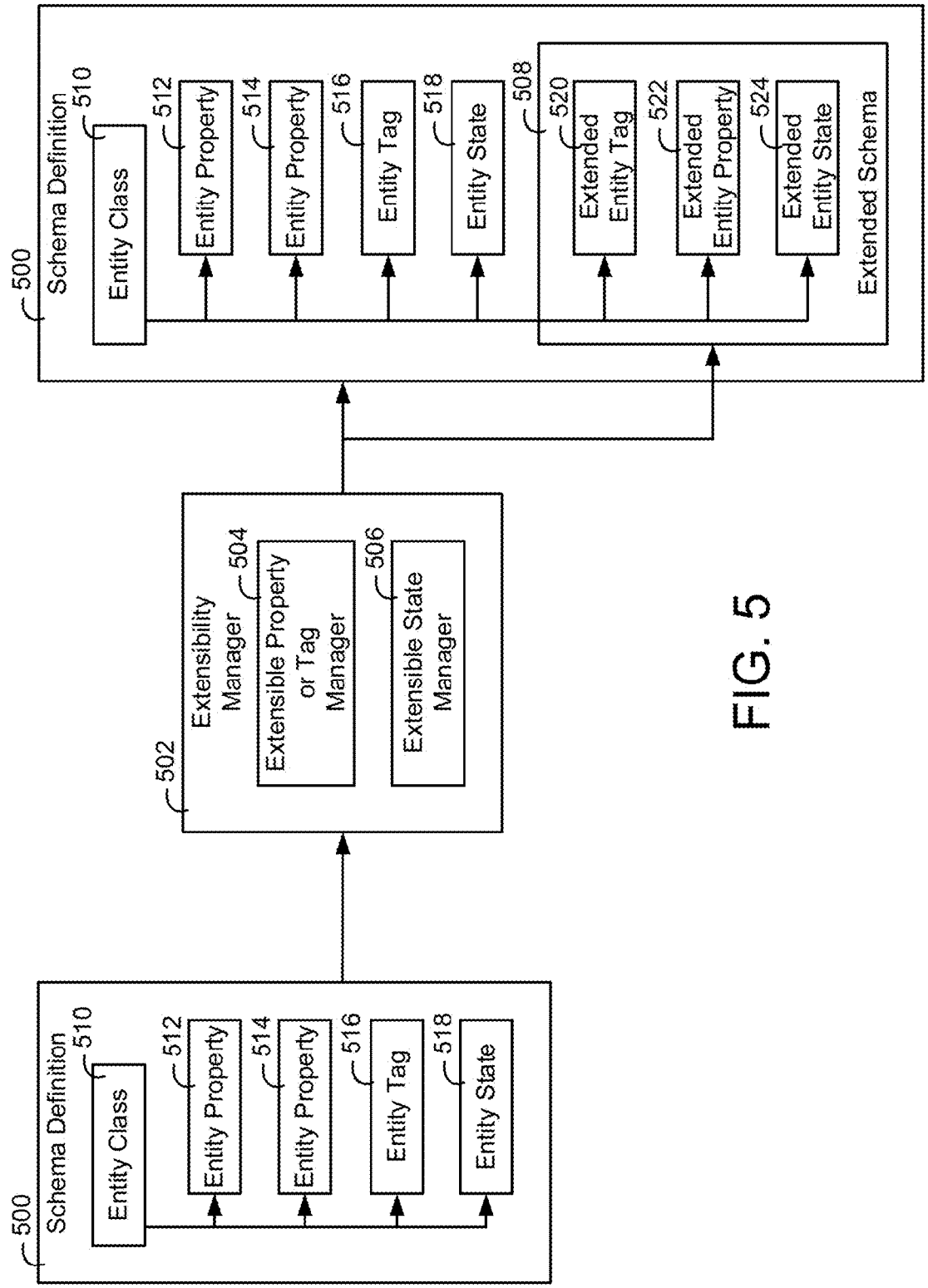
FIG. 5 is a block diagram of an extensibility manager that extends a schema definition of a digital twin at runtime, according to an exemplary embodiment.

Referring generally to FIG. 5, an extensibility manager 502 that extends a schema definition 500 of a digital twin at runtime is shown, according to an exemplary embodiment. The schema definition 500 can be one particular definition of a larger schema. The schema definition 500 provides an example of a particular schema for a particular entity class 510. The schema definition 500 includes various attributes for the entity class 510, e.g., an entity property 512, an entity property 514, an entity tag 516, and an entity state 518. The schema definition 500 could be implemented in a digital twin, e.g., in the graphs described with reference to FIGS. 1-4 or elsewhere herein.

The entity class 510 could be a thermostat class, a person class, a video camera class, a conference room class, etc. The entity class 510 can be a general category of an entity that describes all of the attributes of the entity through the properties, tags, and states defined in the schema definition 500. When a new entity is generated in a digital twin all of the properties, tags, and/or states for said new entity can also be generated and linked to the new entity through relationships, based on the schema definition 500. The schema definition 500 can be stored in a database, in some embodiments.

The entity properties, the entity property 512 and/or the entity property 514, could be properties of the entity class 510, e.g., inputs of a thermostat, outputs of the thermostat, computing resources of a computing system, capacity of a boiler, maximum air changes of an air handler, etc. The entity tag 516 can indicate a tag of the entity class 510, e.g., indicating that at thermostat is part of a test group, indicating a date that maintenance should be performed on a pump system, indicating when a filter was last changed, etc. The entity state 518 could indicate a state of an entity, e.g., a temperature measured by a temperature sensor, a setpoint of a thermostat, an air quality measurement of an air quality sensor, an indication that a variable air volume (VAV) module is in a fault state, etc.

The extensibility manager 502 can be configured to extend the schema definition 500 by adding an extended schema 508 to the schema definition 500. The extensibility manager 502 can perform the extension at runtime, while a building system running the digital twin is currently operating, without requiring any downtime, reconfiguration, recompilation, manual intervention, etc. The extensibility manager 502 includes an extensible property manager 504 and the extensible state manager 506.

The extensible property manager 504 can be configured to add properties and/or tags to the schema definition 500. For example, the manager 504 can add tags and/or properties, e.g., the extended entity tag 520 and/or the extended entity property 522. The tag or property added to the extended schema 508 can be any of the tags or properties discussed herein. The manager 506 can add states to the extended schema 508, e.g., the extended entity state 524. The extended entity state can be any state described herein. The manager 502 can update a digital twin based on the extended schema 508. For example, for each instance of the entity class 510, the manager 502 can cause each instance of the entity class 510 to include new tags, new properties, and/or new states defined by the extended entity tag 520, the extended entity property 522, and/or the extended entity state 524. In some embodiments, the tags, properties, and/or states are set to default values.

Figure 6:
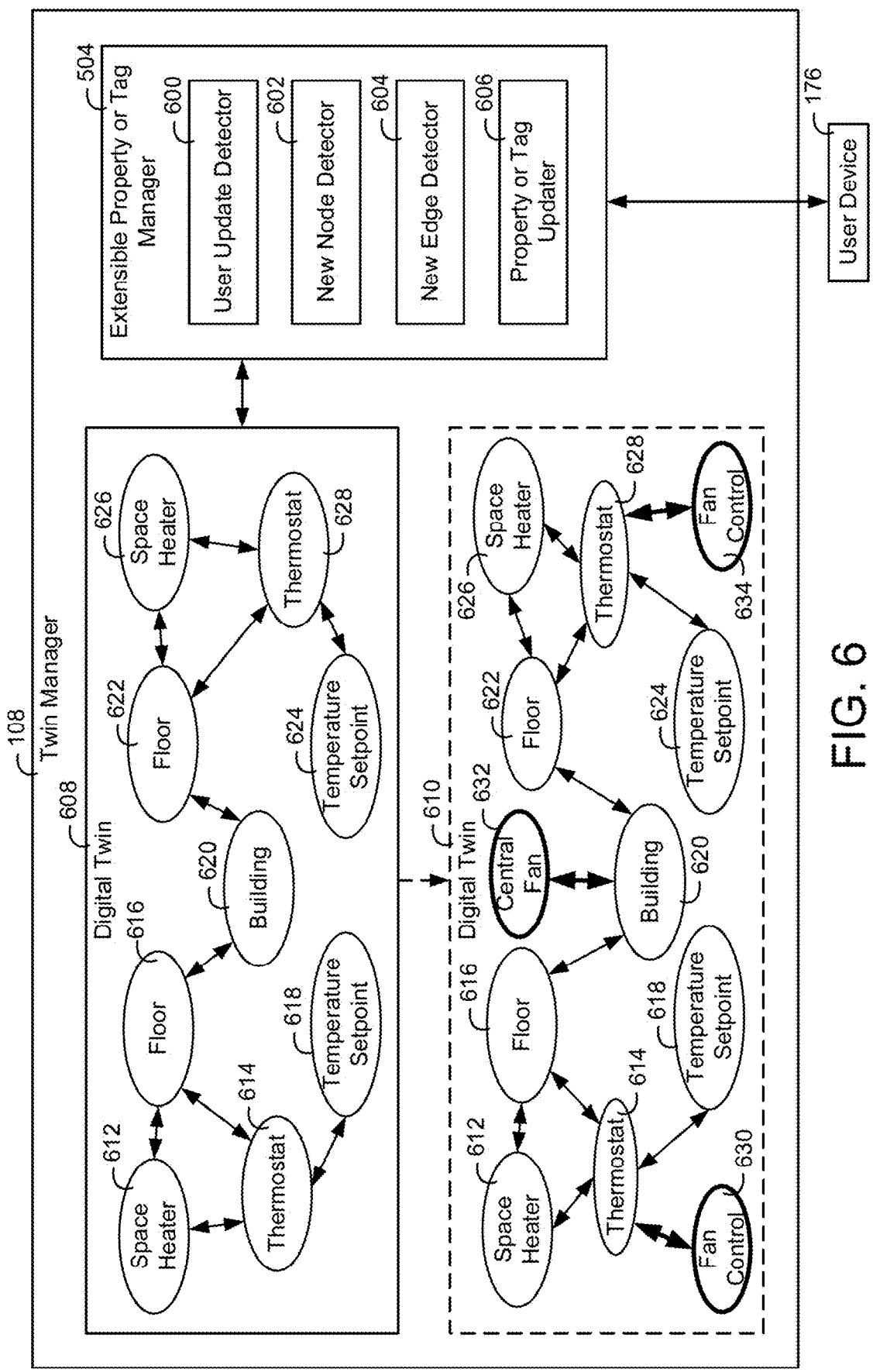
FIG. 6 is a block diagram of the twin manager of FIG. 1 where an extensible property manager updates a digital twin to include new properties in the schema of the digital twin, according to an exemplary embodiment.

Referring now to FIG. 6, the twin manager 108 is shown wherein the extensible property or tag manager 504 updates a digital twin to include new properties or tags in the schema of the digital twin, according to an exemplary embodiment. In FIG. 6, the twin manager 108 includes a digital twin 608 which is updated to the digital twin 610 by the manager 504. The manager 504 extends a schema used to define the entities in the digital twin 608 to add new properties and/or tags to the digital twin 606.

The digital twin 608 includes nodes 612-628 which may be related to each other via edges. The nodes and edges of the digital twin 608 can form a graph, e.g., one of the graphs shown and/or described with reference to FIGS. 1-4 or elsewhere herein. The digital twin 608 includes a building node 620 representing a building. The building node 620 is related by edges to a floor 616 node and a floor node 622, indicating that the building has two separate floors. The floor node 616 is related to a space heater node 612 indicating that the floor has a space heater. The floor node 616 and the space heater 612 are related to a thermostat node 614 by edges indicating that the floor has a thermostat that operates the space heater. The thermostat node 614 is related to a temperature setpoint node 618 to indicate the temperature setpoint of the thermostat.

The floor node 622 is related to a space heater node 626 indicating that the floor has a space heater. The floor node 622 and the space heater 626 are related to a thermostat node 628 by edges indicating that the floor has a thermostat that operates the space heater. The thermostat node 628 is related to a temperature setpoint node 624 to indicate the temperature setpoint of the thermostat.

The manager 504 includes a user update detector 600, a new node detector 602, a new edge detector 604, and a property or tag updater 606. The user update detector 600 can be configured to receive information from the user device 176. The information can be requests for new properties or tags be added to various entity classes. The detector 600 can analyze the data received from the user device 176 and identify which entity classes should have properties and/or tags added. The detector 600 can cause the property or tag updater 606 to add the new properties and/or tags to the entity class in the schema of the digital twin 608 and further cause corresponding nodes and/or edges to be added to the digital twin 608 to represent the new properties and/or tags.

The new node detector 602 can identify that a new node has been added to the digital twin 608. New nodes being added to the digital twin 608 can indicate that new pieces of equipment have been installed in a building, new conference rooms have been formed in the building, new equipment has been discovered via a network, etc. For example, a central fan could be installed in the building, the central fan node 632 could be added to the digital twin 608 to indicate that the central fan operates for the building represented by the building 620. The new node detector 602 could identify the new central fan node 632 and/or the new edge detector 604 could identify a new edge between the building 620 and the central fan 632. The manager 504 could identify that the new nodes and/or edges indicate that new properties and/or tags should be added to the digital twin 608, where the new properties and/or tags may update the schema of the digital twin 608.

For example, if a central fan is added to the building, e.g., the central fan 632 and an edge between the node 632 and the building 620 is added, the manager 504 could identify that control devices of the building should be able to control the central fan, e.g., the control devices have the ability to control the central fan, e.g., because they are connected to the central fan (identified by detecting relationships between the central fan node 632 and a node representing the control devices). The manager 504 can add a fan control property node 630 and a fan control property node 634 to the digital twin 608. These new fan control properties may extend the schema of the digital twin 608 to account for the fact that the thermostats represented by the nodes 614 and 628 can now control a central fan, i.e., represented by the central fan node 632. The nodes 630 and 634 may be capabilities, in some embodiments.

The property or tag updater 606 can be configured to update properties and/or tags based on the detections, identifications, and/or determinations made by the detectors 600-604. The updater 606 can be configured to update a schema that defines the digital twin 608 to generate an updated version of the digital twin 608, the digital twin 610. The updater 606 can cause updates to be made to the digital twin 608 based on the schema. For example, the updater 606 can consult the updated schema to update the properties and/or tags of existing entities of the digital twin 608. Furthermore, when new entities of the updated entity class are added to the digital twin 608, they can be added with the new properties and/or tags. The updater 606 can add nodes representing the new properties and/or tags and edges between the new nodes and the entity node representing a particular instance of the entity class.

Figure 7:
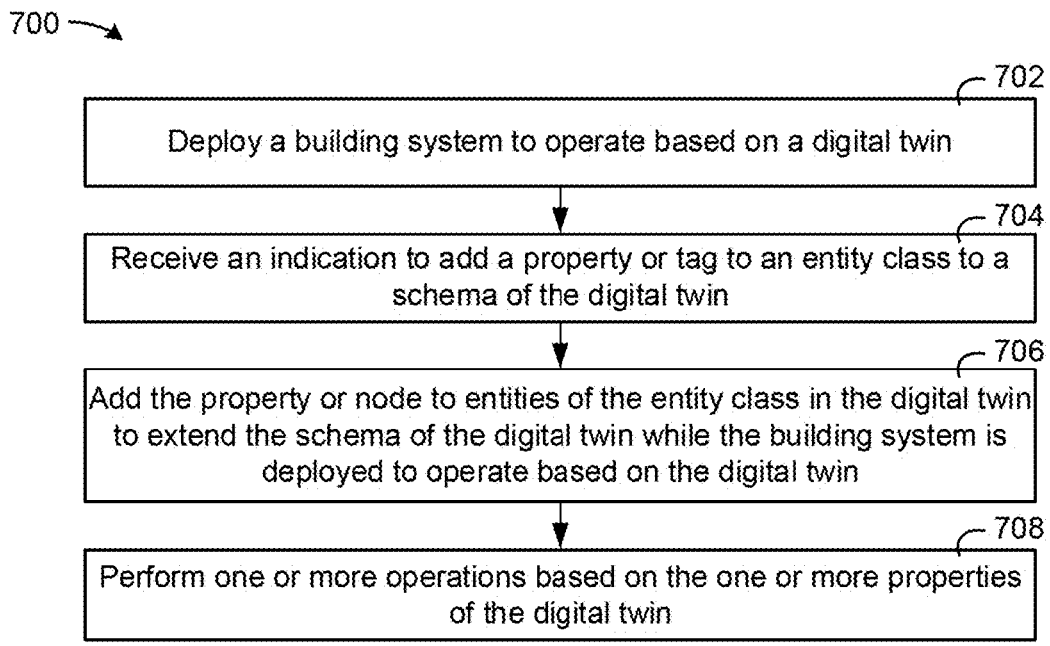
FIG. 7 is a flow diagram of a process where the extensible property manager of FIG. 6 updates a digital twin to include new properties in the schema of the digital twin, according to an exemplary embodiment.

Referring now to FIG. 7, a flow diagram of a process 700 where the extensible property manager of FIG. 6 updates a digital twin to include new properties in the schema of the digital twin is shown, according to an exemplary embodiment. In some embodiments, the manager 504 can be configured to perform the process 700. In some embodiments, any computing device described herein can be configured to perform the process 700.

In step 702, the building data platform 100 can be deployed. The building data platform 100 can be deployed to operate based on a digital twin, e.g., the digital twin 608 and/or any other digital twin and/or graph data structure described herein. For example, various pieces of software and/or systems (e.g., the applications 110) can run against the digital twin, e.g., making equipment control decisions for the building subsystems 122 (e.g., controlling temperature, humidity, lighting, etc.), determining alarms, reducing energy usage of the building subsystems 122, etc.

In step 704, the manager 504 receives an indication to add a property or tag to an entity class of a schema of the digital twin. The indication can, in some embodiments, be received from a user, e.g., via the user device 176. In some embodiments, the manager 504 can derive an insight that the new property or tag should be added by identify changes to the digital twin, e.g., additions or subtractions of nodes and/or edges in the digital twin 608.

In step 706, the manager 504 operates to add the property or tag to entities of the digital twin where the entities are of the entity class. This extends the schema implemented in the digital twin. The extension of the schema, in addition to adding the properties or nodes to the digital twin, can be performed while the building data platform 100 is deployed without requiring reconfiguration and/or redeployment of the building data platform 100 and/or the digital twin.

Updating the schema with new properties or tag for an entity can involve adding nodes and/or edges to the graph for each instance of the entity class. For example, if a new tag is added for a thermostat, the manager 504 can cause a node for the new tag to be added for each thermostat node in the digital twin. The manager 504 can cause one or more edges to relate the new node for the tag and the node for the entity in the digital twin. In step 708, the manager 504 performs one or more operations based on the one or more properties and/or nodes added to the digital twin, the new properties or nodes extending the schema of the digital twin.

Figure 8:
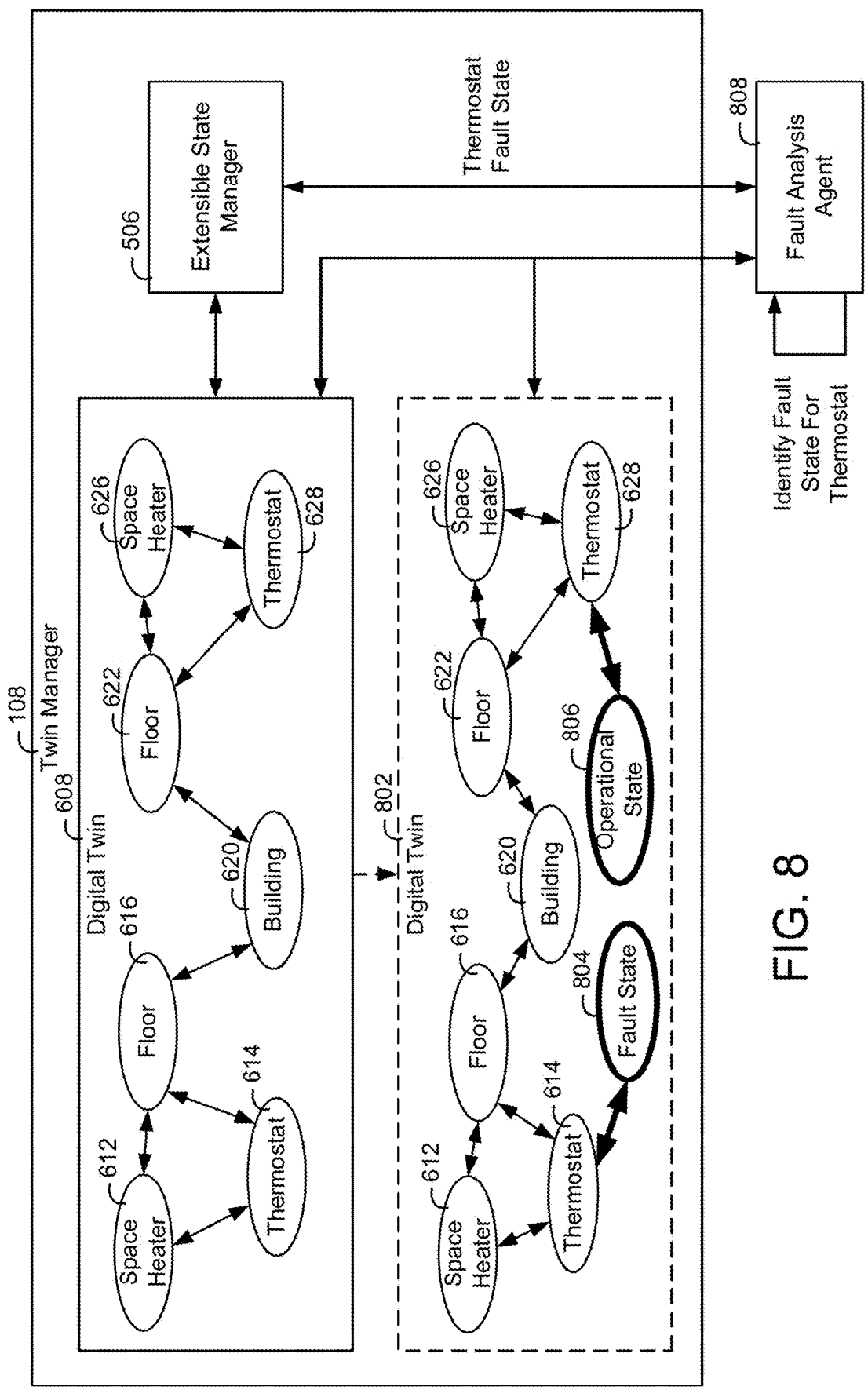
FIG. 8 is a block diagram of an extensible state manager updating the digital twin based on information received from a fault analysis agent, the update causing the digital twin to include new states indicating faults in the schema of the digital twin, according to an exemplary embodiment.

Referring now to FIG. 8, an extensible state manager 506 updating the digital twin 608 based on information received from a fault analysis agent is shown, the update causing the digital twin 608 to include new states indicating faults in the schema of the digital twin 608, according to an exemplary embodiment. In some embodiments, an agent, or any other type of application that consumes the digital twin 608 (or information of the digital twin 608) can add states to the digital twin 608. For example, the fault analysis agent 808 can use a machine learning model to detect faults for pieces of equipment in the digital twin 608 (e.g., by analyzing data and/or operations made by the pieces of equipment).

However, the schema of the digital twin 608 may not have any mechanism for describing a particular device for having a fault or being operational. In this regard, the manager 506 can determine, based on determinations made by the agent

808, to add a state to the schema of the digital twin 608 describing the thermostat fault state. The manager 506 can cause an entity class of thermostat to include a state that indicates whether the thermostat is in a fault state or not. The manager 506 can cause all thermostat instantiated based on the thermostat class to include a state indicating whether the thermostat is in a fault state or not. The manager 506 can cause the default value of the state to be an operational state indicating that no fault is present. However, if the agent 808 identifies a fault, the state can be set to a fault state.

For example, the manager 506 could add a state for each thermostat entity of the digital twin 608. The manager 506 could search the digital twin 608 for all entities of a thermostat class and identify the thermostat node 614 and the thermostat node 628. The manager 506 could cause the fault state node 804 to be generated for the thermostat node 614 and related to the thermostat node 614 via an edge, based on the update made to the schema for the thermostat entity class. The manager 506 can add the operational state node 806 to the digital twin 608 and an edge between the thermostat node 628 and the operational state 806, based on the update made to the schema for the thermostat entity class. The fault state of node 804 can indicate that the thermostat represented by the thermostat node 614 is experiencing a fault. The operational state of node 806 can indicate that the thermostat represented by the thermostat node 628 is not experiencing a fault.

The agent 808 may make the fault determination for the thermostat represented by the thermostat node 614 (e.g., by consuming operational data associated with the thermostat, e.g., store din the digital twin 608). The manager 506 can assume, given no input from the agent 808 to the contrary, that the thermostat represented by the thermostat node 628 is in a operational state since the operational state may be the default state unless the agent 808 indicates otherwise.

Figure 9:
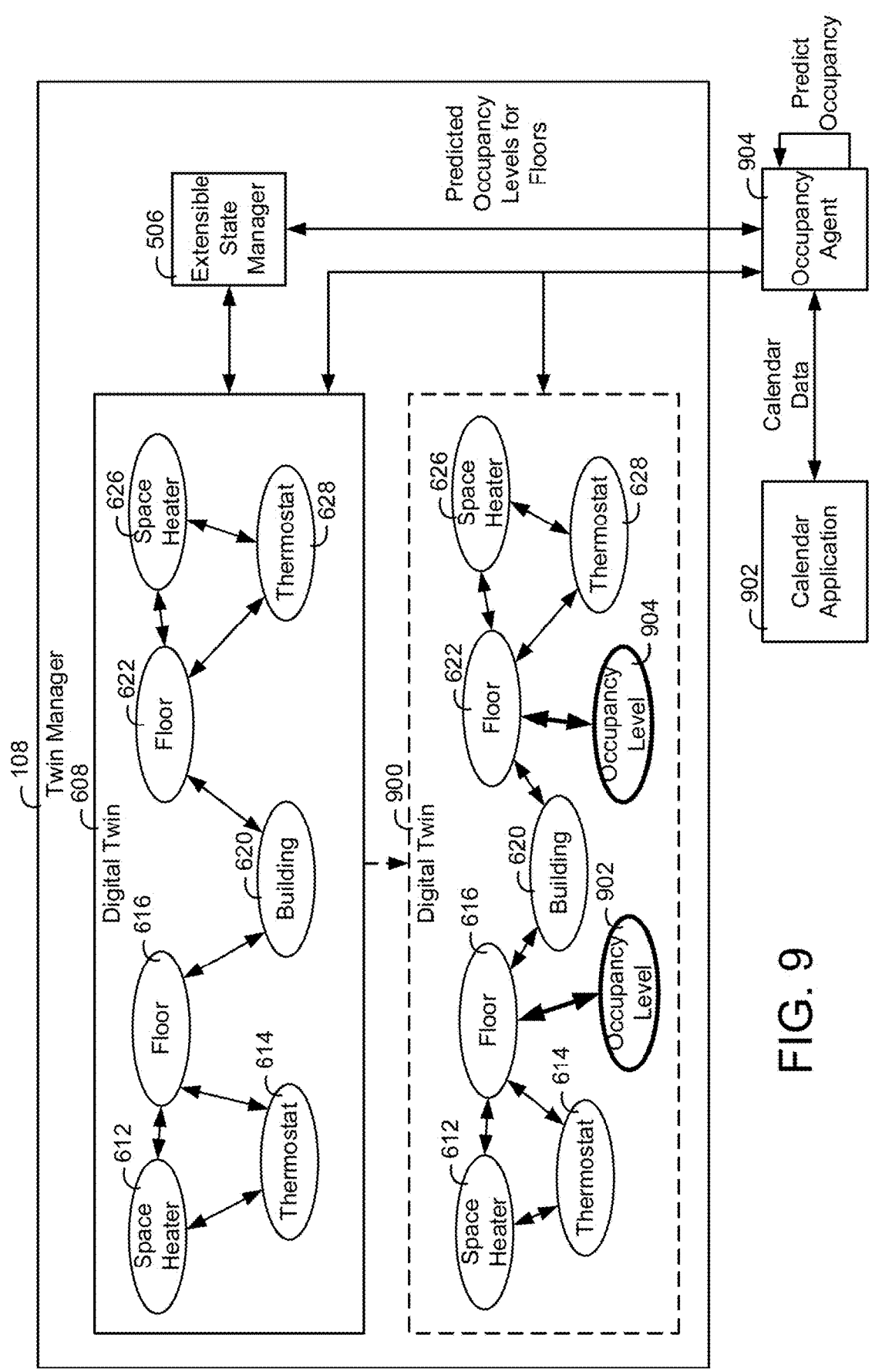
FIG. 9 is a block diagram of the extensible state manager updating the digital twin based on information received from a calendar agent, the update causing the digital twin to include new states indicating occupancy in the schema of the digital twin, according to an exemplary embodiment.

Referring now to FIG. 9, the extensible state manager 506 is shown updating the digital twin 608 based on information received from an occupancy agent 904, the update causing the digital twin 608 to include new states indicating occupancy in the schema of the digital twin, according to an exemplary embodiment. The calendar application 902 could be a system and/or software component that runs for an enterprise and/or building. The calendar application 902 can be configured to schedule and track meetings in various spaces of the building represented by the building node 620. The calendar application 902 could be an OUTLOOK calendar, a GOOGLE calendar, MICROSOFT teams calendar, etc.

The occupancy agent 904 could be an agent that can spin up and down to run against the calendar data of the calendar application 902 to infer and/or determine occupancy levels for various areas of the building, e.g., rooms, conference rooms, meeting rooms, floors, the building itself, etc. The occupancy levels may, in some embodiments, be predicted occupancy levels that are predicted based on upcoming meetings scheduled for various spaces. The agent 904 can be a twin function, twin functions are described with reference to U.S. patent application Ser. No. 17/354,436 filed Jun. 22, 2021 and U.S. patent application Ser. No. 17/354,338 filed Jun. 22, 2021, the entireties of which is incorporated by reference herein.

The manager 506 can receive predicted occupancy levels for the floor represented by the floor node 616 and the floor represented by the floor node 622. The manager 506 can review a schema of the digital twin 608 and identify that an occupancy state does not exist for floors and that an occupancy level has been predicted for the floors. The manager 506 can determine that an occupancy state should be added to the schema for a floor class based on the determinations made by the agent 904. The manager 506 can operate to add the occupancy state as an attribute for a floor class, identify all floor entities of the floor class (e.g., the floor node 616 and the floor node 622, add nodes to represent the occupancy level (e.g., the occupancy level node 902 and the occupancy level node 904), and relate the nodes 902 and 904 to the nodes 616 and 622 respectively by one or more edges.

The occupancy levels added to the schema of the digital twin for the floor class can be consumed by other applications. For example, the calendar application 902 could use the occupancy level data in the digital twin 900 to determine which rooms, floors, buildings, etc., are available or booked. Extending state definitions within the schema of the digital twin 608 allows for the digital twin 608 to adapt to new pieces of software that are running against the digital twin and enable plug-and-play capabilities and allow for state to be added to and queried against at runtime, without the need to update models, rebuild or redeploy any services, or do any data migration. For example, if a new application is deployed to run with the building data platform 100 and starts outputting a new state not currently in the schema of the digital twin 608, the manager 608 can identify that the output of the application should be added to digital twin 608 and the schema of the digital twin 608 should be added.

Figure 10:
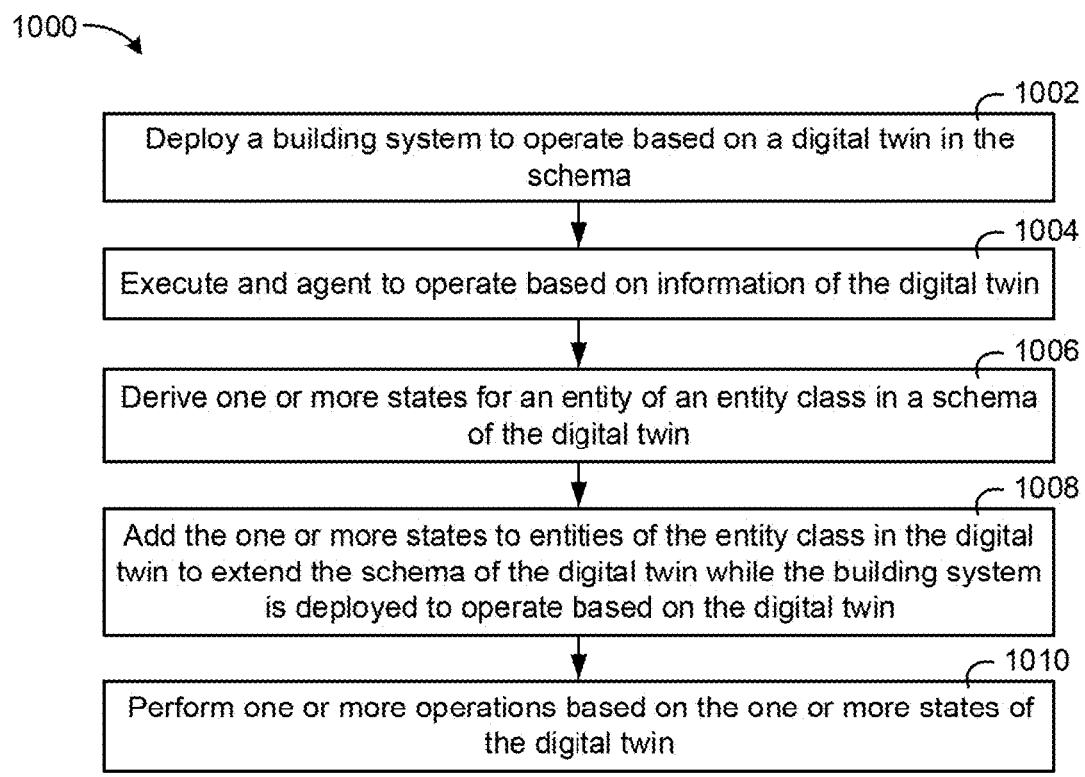
FIG. 10 is a flow diagram of a process of updating the digital twin based on information received from an agent, the update causing the digital twin to include new states indicating occupancy in the schema of the digital twin, according to an exemplary embodiment.

Referring now to FIG. 10, a process 1000 of updating the digital twin 608 based on information received from an agent is shown, the update causing the digital twin to include new states indicating occupancy in the schema of the digital twin, according to an exemplary embodiment. In some embodiments, the manager 506 can be configured to perform the process 1000. In some embodiments, any computing device described herein can be configured to perform the process 1000.

In step 1002, the building data platform 100 is deployed to operate based on a digital twin in a particular schema. The building data platform 100 can be deployed to operate based on a digital twin, e.g., the digital twin 608 and/or any other digital twin and/or graph data structure described herein. For example, various pieces of software and/or systems (e.g., the applications 110) can run against the digital twin, e.g., making equipment control decisions for the building subsystems 122 (e.g., controlling temperature, humidity, lighting, etc.), determining alarms, reducing energy usage of the building subsystems 122, etc.

In step 1004, the building data platform 100 can execute an agent to operate based on information of the digital twin 608. In some embodiments, in addition to or instead of the agent, another application can run against the digital twin 608, e.g., a fault detection application, a calendar application, an occupancy prediction application, an energy savings application, etc. In some embodiments, the agent (and/or the additional application) can run against data of the digital twin (and/or other information of the additional application) to determine new information.

In step 1006, one or more states can be derived for an entity of an entity class in the schema of the digital twin 608 by the manager 506. The manager 506 can review information determined by the agent and/or application to determine that a new state should be added to an entity class for the schema of the digital twin 608. For example, if the agent outputs a fault indication, an occupancy indication, etc. for a particular entity that is not currently accounted for in the schema of the digital twin, the manager 506 can determine to add a new state type to the schema for the entity class.

In step 1008, the manager 506 can add one or more states to entities of the entity class in the digital twin, thus extending the schema of the digital twin 608 while the building system is deployed to operate based on the digital twin. The manager 506 can add the states as nodes to the digital twin 608 with edges between the state nodes and nodes representing the entities. The manager 506 can search the digital twin 608 for each entity of the entity class and add the new state to each entity of the entity class.

In step 1010, one or more operations can be performed based on the one or more new states of the digital twin 608. The one or more operations can consume the new states of the digital twin 608 and make operational decisions based on the new states. For example, the predicted occupancy states could be used to determine appropriate temperature and/or humidity control operations of the building subsystems 122. Similarly, fault states of the building subsystems 122 could be used by a maintenance system to schedule maintenance for the building subsystems 122.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

In various implementations, the steps and operations described herein may be performed on one processor or in a combination of two or more processors. For example, in some implementations, the various operations could be performed in a central server or set of central servers configured to receive data from one or more devices (e.g., edge computing devices/controllers) and perform the operations. In some implementations, the operations may be performed by one or more local controllers or computing devices (e.g., edge devices), such as controllers dedicated to and/or located within a particular building or portion of a building. In some implementations, the operations may be performed by a combination of one or more central or offsite computing devices/servers and one or more local controllers/computing devices. All such implementations are contemplated within the scope of the present disclosure. Further, unless otherwise indicated, when the present disclosure refers to one or more computer-readable storage media and/or one or more controllers, such computer-readable storage media and/or one or more controllers may be implemented as one or more central servers, one or more local controllers or computing devices (e.g., edge devices), any combination thereof, or any other combination of storage media and/or controllers regardless of the location of such devices.

What is claimed is:

1. A building system comprising one or more memory devices comprising instructions thereon that, when executed by one or more processors, cause the one or more processors to:
    deploy a digital twin of a building in a schema defining data elements of the digital twin and perform one or more first operations based on the data elements of the digital twin of the building defined by the schema to derive a new property or tag for a first entity of an entity class, the digital twin comprising representations of a plurality of entities of the building and relationships between the plurality of entities;
    identify the entity class of the first entity based on the schema;
    update the schema of the digital twin by adding the new property or tag to the entity class of the schema to extend the schema while the digital twin is deployed responsive to identifying that a class of the first entity is the entity class;
    add, based on the schema, one or more data elements representing the new property or tag to the digital twin, the one or more data elements related to a second entity of the entity class, wherein the second entity is different from the first entity; and perform one or more second operations based on the one or more data elements representing the new property or tag.

2. The building system of claim 1, wherein the plurality of entities include at least one of a person, point, location, or event, wherein the schema defines entity classes for entity types of the plurality of entities.

3. The building system of claim 1, wherein the plurality of entities are instances of entity classes defined by the schema.

4. The building system of claim 1, wherein the new property or the tag defines a characteristic of the first entity or the second entity.

5. The building system of claim 1, wherein the instructions cause the one or more processors to update the schema of the digital twin while the digital twin is deployed without requiring the digital twin to be redeployed.

6. The building system of claim 1, wherein the schema defines a plurality of entity classes, the plurality of entity classes indicating properties, tags, and states for the plurality of entity classes.

7. The building system of claim 1, wherein the instructions cause the one or more processors to:
receive user input from a user device, the user input defining a second property or tag to be added to the entity class of the schema; and
update, based on the user input, the schema of the digital twin by adding the second property or tag to the entity class of the schema in response to receiving the user input.

8. The building system of claim 1, wherein the instructions cause the one or more processors to:
identify a plurality of entity nodes indicating entities in the entity class; and
add, based on the schema, the one or more nodes representing the new property or tag to the digital twin for each of the plurality of entity nodes, the one or more nodes related to the plurality of entity nodes.

9. The building system of claim 1, wherein the instructions cause the one or more processors to:
identify an update to one or more particular nodes or one or more particular edges of the digital twin, the update indicating changes affecting the first entity;
determine that the update indicates a change to one or more characteristics of the first entity; and
update the schema of the digital twin by adding the new property or tag to the entity class of the schema responsive to determining that the update indicates the change to the one or more characteristics of the first entity.

10. The building system of claim 1, wherein a first processor of the one or more processors deploys the digital twin;
wherein a second processor of the one or more processors derives the new property or tag for the entity class, updates the schema of the digital twin with the new property or tag, and adds the one or more data elements to the digital twin.

11. A method comprising:
deploying, by one or more processing circuits, a digital twin of a building in a schema defining data elements of the digital twin;
performing, by the one or more processing circuits, one or more first operations based on the data elements of the digital twin of the building defined by the schema to derive a new property or tag for a first entity of an entity class, the digital twin comprising representations of a plurality of entities of the building and relationships between the plurality of entities;
identifying, by the one or more processing circuits, the entity class of the first entity based on the schema;
updating, by the one or more processing circuits, the schema of the digital twin by adding the new property or tag to the entity class of the schema to extend the schema while the digital twin is deployed responsive to identifying that a class of the first entity is the entity class;
adding, by the one or more processing circuits, based on the schema, one or more data elements representing the new property or tag to the digital twin, the one or more data elements related to a second entity of the entity class, wherein the second entity is different from the first entity; and
performing, by the one or more processing circuits, one or more second operations based on the one or more data elements representing the new property or tag.

12. The method of claim 11, wherein the plurality of entities include at least one of a person, point, location, or event, wherein the schema defines entity classes for entity types of the plurality of entities.

13. The method of claim 11, wherein the new property or the tag defines a characteristic of the first entity.

14. The method of claim 11, wherein updating, by the one or more processing circuits, the schema of the digital twin includes updating the schema while the digital twin is deployed without requiring the digital twin to be redeployed.

15. The method of claim 11, wherein the schema defines a plurality of entity classes, the plurality of entity classes indicating properties, tags, and states for the plurality of entity classes.

16. The method of claim 11, further comprising:
identifying, by the one or more processing circuits, a plurality of entity nodes indicating entities in the entity class; and
adding, by the one or more processing circuits, based on the schema, the one or more nodes representing the new property or tag to the digital twin for each of the plurality of entity nodes, the one or more nodes related to the plurality of entity nodes.

17. One or more memory devices comprising instructions thereon that, when executed by one or more processors, cause the one or more processors to:
deploy a digital twin of a building in a schema defining data elements of the digital twin and perform one or more first operations based on the data elements of the digital twin of the building defined by the schema to derive a new property or tag for a first entity an entity class, the digital twin comprising representations of a plurality of entities of the building and relationships between the plurality of entities;
identify the entity class of the first entity based on the schema;
update the schema of the digital twin by adding the new property or tag to the entity class of the schema to extend the schema while the digital twin is deployed responsive to identifying that a class of the first entity is the entity class;
add, based on the schema, one or more data elements representing the new property or tag to the digital twin, the one or more data elements related to a second entity of the entity class, wherein the second entity is different from the first entity; and perform one or more second operations based on the one or more data elements representing the new property or tag.

18. The one or more memory devices of claim 17, wherein the plurality of entities include at least one of a person, point, location, or event, wherein the schema defines entity classes for entity types of the plurality of entities.

19. The one or more memory devices of claim 17, wherein the new property or the tag defines a characteristic of the first entity.

20. The one or more memory devices of claim 17, wherein updating, by the one or more processors, the schema of the digital twin includes updating the schema while the digital twin is deployed without requiring the digital twin to be redeployed.

* * * * *